US012326690B2

(12) United States Patent
Murata et al.

(10) Patent No.: US 12,326,690 B2
(45) Date of Patent: Jun. 10, 2025

(54) TONER AND METHOD FOR PRODUCING TONER

(71) Applicant: CANON KABUSHIKI KAISHA, Tokyo (JP)

(72) Inventors: Kazuki Murata, Tokyo (JP); Takeshi Hashimoto, Ibaraki (JP); Yukihiro Abe, Chiba (JP); Miki Ueda, Tokyo (JP); Hayato Ida, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 665 days.

(21) Appl. No.: 17/654,481

(22) Filed: Mar. 11, 2022

(65) Prior Publication Data

US 2022/0299901 A1 Sep. 22, 2022

(30) Foreign Application Priority Data

Mar. 19, 2021 (JP) ................................ 2021-045565

(51) Int. Cl.
*G03G 9/08* (2006.01)
*G03G 9/087* (2006.01)

(52) U.S. Cl.
CPC ......... *G03G 9/0825* (2013.01); *G03G 9/0815* (2013.01); *G03G 9/0819* (2013.01); *G03G 9/08711* (2013.01); *G03G 9/08755* (2013.01)

(58) Field of Classification Search
CPC .. G03G 9/0825; G03G 9/0815; G03G 9/0819; G03G 9/08711; G03G 9/08755
See application file for complete search history.

(56) References Cited

U.S. PATENT DOCUMENTS

| | | | |
|---|---|---|---|
| 9,057,970 | B2 | 6/2015 | Ida et al. |
| 9,152,088 | B1 | 10/2015 | Kobori et al. |
| 9,348,247 | B2 | 5/2016 | Ida et al. |
| 9,348,253 | B2 | 5/2016 | Kanno et al. |

(Continued)

FOREIGN PATENT DOCUMENTS

| | | | |
|---|---|---|---|
| JP | 2014-48576 | A | 3/2014 |
| JP | 2014-59489 | A | 4/2014 |

(Continued)

OTHER PUBLICATIONS

U.S. Appl. No. 17/457,766, Yuya Chimoto, filed Dec. 6, 2021.

(Continued)

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle comprising a binder resin, wherein the binder resin comprises a first resin and a second resin, the first resin is a crystalline resin, the second resin is an amorphous resin, in an observation of a cross section of the toner particle with a transmission electron microscope, a matrix-domain structure composed of a matrix comprising the first resin and domains comprising the second resin is present, an area ratio occupied by the matrix in a total area of the matrix and the domains is from 35 area % to 70 area %, a [hydrocarbon group index (Ge)]/[hydrocarbon group index (DIA)] after washing the toner with hexane is 1.10 or more.

9 Claims, 1 Drawing Sheet

(56) References Cited

U.S. PATENT DOCUMENTS

| | | | | |
|---|---|---|---|---|
| 9,417,540 | B2 | 8/2016 | Hashimoto et al. | |
| 9,436,112 | B2 | 9/2016 | Iwasaki et al. | |
| 9,540,483 | B2 | 1/2017 | Ida et al. | |
| 9,575,426 | B2 * | 2/2017 | Shimano ............ | G03G 9/09371 |
| 9,651,883 | B2 | 5/2017 | Hama et al. | |
| 9,665,026 | B2 | 5/2017 | Iwasaki et al. | |
| 9,696,644 | B2 | 7/2017 | Ida et al. | |
| 9,897,934 | B2 | 2/2018 | Tamura et al. | |
| 10,012,920 | B2 | 7/2018 | Shibata et al. | |
| 10,036,970 | B2 | 7/2018 | Kanno et al. | |
| 10,078,281 | B2 | 9/2018 | Ida et al. | |
| 10,082,743 | B2 | 9/2018 | Hama et al. | |
| 10,088,765 | B2 | 10/2018 | Miyakai et al. | |
| 10,146,146 | B2 | 12/2018 | Komatsu et al. | |
| 10,175,595 | B2 | 1/2019 | Onozaki et al. | |
| 10,197,936 | B2 | 2/2019 | Onozaki et al. | |
| 10,203,619 | B2 | 2/2019 | Yamashita et al. | |
| 10,228,629 | B2 | 3/2019 | Tamura et al. | |
| 10,274,851 | B2 | 4/2019 | Hashimoto et al. | |
| 10,353,312 | B2 | 7/2019 | Kamae et al. | |
| 10,401,748 | B2 | 9/2019 | Hashimoto et al. | |
| 10,423,086 | B2 | 9/2019 | Hama et al. | |
| 10,451,986 | B2 | 10/2019 | Sano et al. | |
| 10,451,990 | B2 | 10/2019 | Kamae et al. | |
| 10,474,049 | B2 | 11/2019 | Onozaki et al. | |
| 10,514,624 | B2 | 12/2019 | Tamura et al. | |
| 10,564,560 | B2 | 2/2020 | Onozaki et al. | |
| 10,599,060 | B2 | 3/2020 | Kanno et al. | |
| 10,656,545 | B2 | 5/2020 | Kamae et al. | |
| 10,775,710 | B1 | 9/2020 | Kamae et al. | |
| 10,859,931 | B2 | 12/2020 | Hashimoto et al. | |
| 10,877,386 | B2 | 12/2020 | Murayama et al. | |
| 10,969,705 | B2 | 4/2021 | Shirayama et al. | |
| 11,029,617 | B2 | 6/2021 | Chimoto et al. | |
| 11,131,939 | B2 | 9/2021 | Hama et al. | |
| 11,181,848 | B2 | 11/2021 | Ochi et al. | |
| 2011/0136060 | A1 * | 6/2011 | Fujikawa ........... | G03G 9/08755 430/137.18 |
| 2013/0108955 | A1 | 5/2013 | Shibata et al. | |
| 2013/0288173 | A1 | 10/2013 | Hashimoto et al. | |
| 2014/0308611 | A1 | 10/2014 | Shimano | |
| 2014/0329176 | A1 | 11/2014 | Kanno et al. | |
| 2015/0099227 | A1 | 4/2015 | Ida et al. | |
| 2016/0109820 | A1 | 4/2016 | Hashimoto et al. | |
| 2018/0314176 | A1 | 11/2018 | Ikeda et al. | |
| 2020/0233327 | A1 | 7/2020 | Honda et al. | |
| 2021/0141315 | A1 | 5/2021 | Kamae et al. | |
| 2021/0181647 | A1 | 6/2021 | Hashimoto et al. | |
| 2021/0181649 | A1 | 6/2021 | Kanno et al. | |
| 2021/0181650 | A1 | 6/2021 | Hama et al. | |
| 2021/0181651 | A1 | 6/2021 | Kanno et al. | |
| 2021/0278774 | A1 | 9/2021 | Hashimoto et al. | |
| 2021/0278775 | A1 | 9/2021 | Kamae et al. | |
| 2021/0302853 | A1 | 9/2021 | Murata et al. | |
| 2021/0302854 | A1 | 9/2021 | Kitamura et al. | |
| 2022/0050398 | A1 | 2/2022 | Ooyama et al. | |

FOREIGN PATENT DOCUMENTS

| | | | |
|---|---|---|---|
| JP | 2014-130243 | A | 7/2014 |
| JP | 2014-142632 | A | 8/2014 |
| JP | 2019-214706 | A | 12/2019 |
| JP | 2019-219641 | A | 12/2019 |
| JP | 2019-219643 | A | 12/2019 |
| JP | 2019-219645 | A | 12/2019 |
| JP | 2022-093277 | A | 6/2022 |
| WO | 2019/073731 | A1 | 4/2019 |

OTHER PUBLICATIONS

U.S. Appl. No. 17/457,822, Hisasuke Kajihara, filed Dec. 6, 2021.
U.S. Appl. No. 17/536,853, Hisasuke Kajihara, filed Nov. 29, 2021.
U.S. Appl. No. 17/542,006, Masaharu Miura, filed Dec. 3, 2021.
U.S. Appl. No. 17/648,330, Hiroki Watanabe, filed Jan. 19, 2022.
U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/654,461, Yukihiro Abe, filed Mar. 11, 2022.
U.S. Appl. No. 17/656,282, Takeshi Hashimoto, filed Mar. 24, 2022.
U.S. Appl. No. 17/659,084, Kouichirou Ochi, filed Apr. 13, 2022.
U.S. Appl. No. 17/663,935, Miki Ueda, filed May 18, 2022.
U.S. Appl. No. 17/664,102, Megumi Shino, filed May 19, 2022.

* cited by examiner

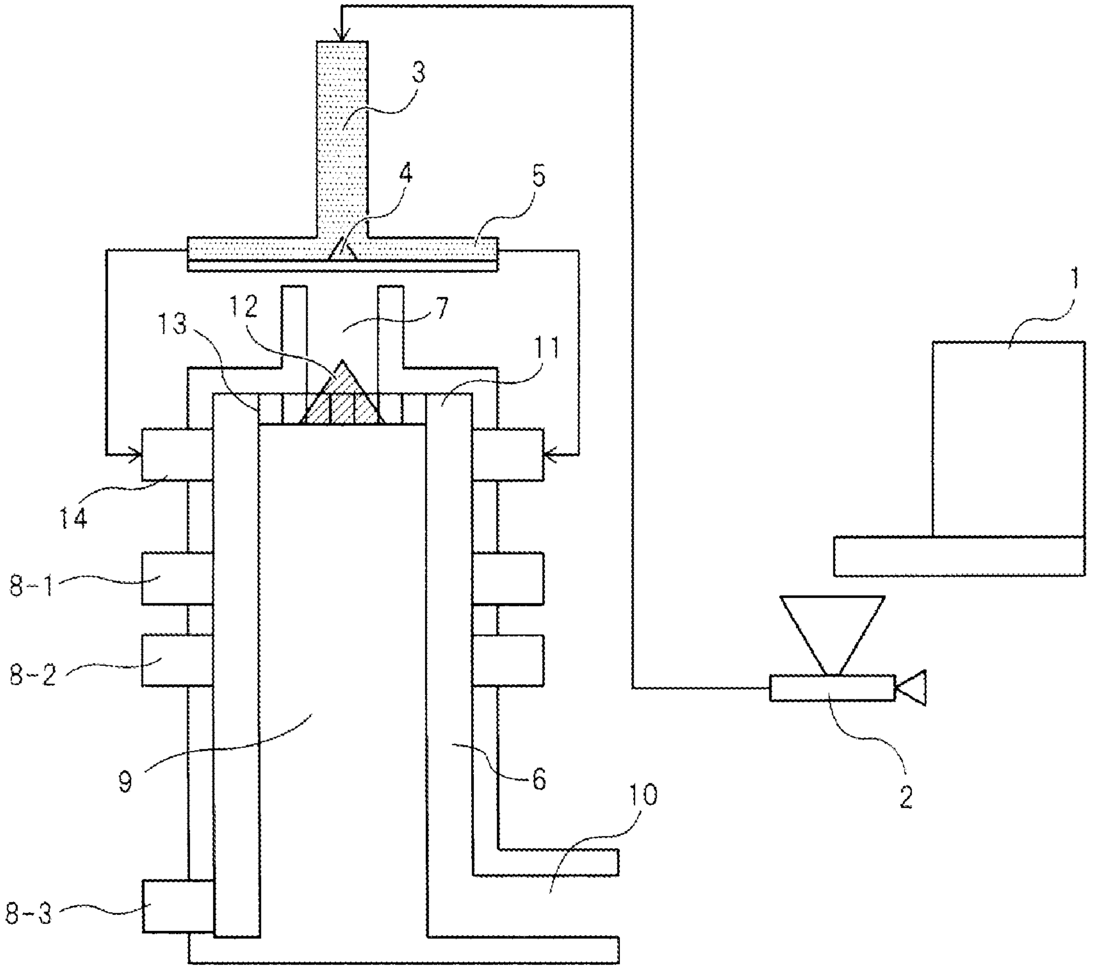
3
4
5
12
7
13
11
1
14
8-1
8-2
9
6
10
2
8-3

TONER AND METHOD FOR PRODUCING TONER

BACKGROUND OF THE INVENTION

Field of the Invention

The present disclosure relates to a toner that can be used in an electrophotographic method, an electrostatic recording method, an electrostatic printing method, a toner jet method, and the like, and to a method for producing the toner.

Description of the Related Art

In recent years, with the widespread use of electrophotographic full-color copiers, in addition to high speed and high image quality, improvement of additional performance such as energy saving performance, shortened recovery time from a sleep state, and suitability for a wide variety of media is also required. Specifically, as a toner enabling energy saving, a toner having excellent low-temperature fixability that can be fixed at a lower temperature is required in order to reduce power consumption in the fixing process.

The toner described in Japanese Patent Application Publication No. 2014-130243 uses a crystalline vinyl resin having a sharp melt property as a main binder, hence excellent low-temperature fixability can be achieved.

The toners described in Japanese Patent Application Publication No. 2014-059489 and Japanese Patent Application Publication No. 2014-142632 have a matrix-domain structure, and a crystalline resin having a sharp melt property forms a matrix, so that excellent low-temperature fixability becomes possible.

SUMMARY OF THE INVENTION

Meanwhile, embossed paper, which is one of a wide variety of media, has unevenness on the paper surface, hence toner transferability to recesses in a transfer process is low, and an image density difference is likely to occur between the recesses and protrusions. Therefore, there is a demand for a toner having excellent emboss transferability, such that no image density difference occurs even in printing on embossed paper.

Since the toner described in Japanese Patent Application Publication No. 2014-130243 uses a crystalline resin having high molecular mobility, the electric charge dissipates, the electric charge leaks to a member such as a drum or an intermediate transfer belt (ITB), and the charge quantity carried by one toner particle becomes low. It was found that as a result, the electric-field driving-force becomes small and the emboss transferability may be inferior.

In the toner described in Japanese Patent Application Publication No. 2014-059489, since the toner particle surface is composed of different materials, namely, a crystalline resin and an amorphous resin, electric charges are trapped at the interface thereof, and the dissipation of electric charges becomes insufficient, hence the charge quantity on the contact surface increases. As a result, the electrostatic adhesion force with the member becomes high, and the emboss transferability may be inferior. Further, in the toner described in Japanese Patent Application Publication No. 2014-142632, since the toner particle surface is covered with an amorphous resin shell having low molecular mobility, the dissipation of electric charges becomes insufficient and the charge quantity on the contact surface becomes high. As a result, the electrostatic adhesion force with the member becomes high, and the emboss transferability may be inferior.

The present disclosure provides a toner that exhibits excellent low-temperature fixability and also exhibits excellent emboss transferability.

The present disclosure relates to a toner comprising a toner particle comprising a binder resin, wherein the binder resin comprises a first resin and a second resin, the first resin is a crystalline resin, the second resin is an amorphous resin, in an observation of a cross section of the toner particle with a transmission electron microscope, a matrix-domain structure composed of a matrix comprising the first resin and domains comprising the second resin is present, an area ratio occupied by the matrix in a total area of the matrix and the domains is from 35 area % to 70 area %, a [hydrocarbon group index (Ge)]/[hydrocarbon group index (DIA)] after washing the toner with hexane is 1.10 or more, the hydrocarbon group index (Ge) is a value of A (Ge)/B (Ge) where A (Ge) is a maximum absorption peak intensity in a range of 2800 $cm^{-1}$ to 2900 $cm^{-1}$ corresponding to a stretching vibration of C—H and B (Ge) is a maximum absorption peak intensity in a range of 1500 $cm^{-1}$ to 1800 $cm^{-1}$ corresponding to a stretching vibration of C═O in an FT-IR spectrum obtained by using Ge as an ATR crystal and performing measurements by an ATR method under condition of an infrared light incident angle being 45°, the hydrocarbon group index (DIA) is a value of A (DIA)/B (DIA) where A (DIA) is a maximum absorption peak intensity in a range of 2800 $cm^{-1}$ to 2900 $cm^{-1}$ corresponding to the stretching vibration of C—H and B (DIA) is a maximum absorption peak intensity in a range of 1500 $cm^{-1}$ to 1800 $cm^{-1}$ corresponding to the stretching vibration of C═O in an FT-IR spectrum obtained by using diamond as an ATR crystal and performing measurements by the ATR method under condition of the infrared light incident angle being 45°.

The present disclosure can provide a toner that exhibits excellent low-temperature fixability and also exhibits excellent emboss transferability. Further features of the present invention will become apparent from the following description of exemplary embodiments with reference to the attached drawings.

BRIEF DESCRIPTION OF THE DRAWINGS

The FIGURE is an example of a thermal spheroidizing treatment device.

DESCRIPTION OF THE EMBODIMENTS

Unless otherwise specified, descriptions of numerical ranges such as "from XX to YY" or "XX to YY" in the present disclosure include the numbers at the upper and lower limits of the range. In the present disclosure, a (meth)acrylic acid ester means an acrylic acid ester and/or a methacrylic acid ester. When numerical ranges are described in stages, the upper and lower limits of each of each numerical range may be combined arbitrarily. The term "monomer unit" describes one carbon-carbon bonded section in a principal chain of polymerized vinyl monomers in a polymer is given as one unit. A vinyl monomer can be represented by the following formula (Z):

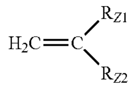

(Z)

In formula (Z), $R_{Z1}$ represents a hydrogen atom or alkyl group (preferably a $C_{1-3}$ alkyl group, or more preferably a methyl group), and $R_{Z2}$ represents any substituent. A crystalline resin is a resin exhibiting a clear endothermic peak in differential scanning calorimetry (DSC) measurement.

The present disclosure relates to a toner comprising a toner particle comprising a binder resin, wherein the binder resin comprises a first resin and a second resin, the first resin is a crystalline resin, the second resin is an amorphous resin, in an observation of a cross section of the toner particle with a transmission electron microscope, a matrix-domain structure composed of a matrix comprising the first resin and domains comprising the second resin is present, an area ratio occupied by the matrix in a total area of the matrix and the domains is from 35 area % to 70 area %, a [hydrocarbon group index (Ge)]/[hydrocarbon group index (DIA)] after washing the toner with hexane is 1.10 or more, the hydrocarbon group index (Ge) is a value of A (Ge)/B (Ge) where A (Ge) is a maximum absorption peak intensity in a range of 2800 $cm^{-1}$ to 2900 $cm^{-1}$ corresponding to a stretching vibration of C—H and B (Ge) is a maximum absorption peak intensity in a range of 1500 $cm^{-1}$ to 1800 $cm^{-1}$ corresponding to a stretching vibration of C═O in an FT-IR spectrum obtained by using Ge as an ATR crystal and performing measurements by an ATR method under condition of an infrared light incident angle being 45°, the hydrocarbon group index (DIA) is a value of A (DIA)/B (DIA) where A (DIA) is a maximum absorption peak intensity in a range of 2800 $cm^{-1}$ to 2900 $cm^{-1}$ corresponding to the stretching vibration of C—H and B (DIA) is a maximum absorption peak intensity in a range of 1500 $cm^{-1}$ to 1800 $cm^{-1}$ corresponding to the stretching vibration of C═O in an FT-IR spectrum obtained by using diamond as an ATR crystal and performing measurements by the ATR method under condition of the infrared light incident angle being 45°.

With the toner, it is possible to provide a toner having both low-temperature fixability and emboss transferability. As a result of diligent studies by the present inventors, it has been found that the above problems can be solved by controlling the matrix-domain structure of the crystalline resin and amorphous resin, the occupied area of the matrix including the crystalline resin, and the [hydrocarbon group index (Ge)]/[hydrocarbon group index (DIA)] after washing the toner with hexane to specific ranges.

The present inventors speculate that the reason for solving the above problem is as follows. The transferability of the toner is determined by the magnitude relationship between the electric field driving force due to the electric field and the adhesion with a member such as a drum or an ITB, and when the electric field driving force exceeds the adhesive force, the toner can be transferred. The reason why the emboss transferability is lowered is that when a gap with the member is large such as in a recess of embossed paper, the electric field driving force therein is reduced and the transferability of the toner is degraded. Further, the electric field driving force greatly depends on the charge quantity of one toner particle, while the adhesive force greatly depends on the charge quantity of the contact surface with the member. Therefore, where the charge quantity of the toner is increased at random in order to increase the electric field driving force, since the adhesive force also increases at the same time, such an increase in the charge quantity does not lead to the improvement of emboss transferability. Further, it is conceivable to add a large amount of inorganic fine particles to the toner surface in order to reduce the non-electrostatic adhesive force, but the inorganic fine particles inhibit the fixing, so that the low-temperature fixability is degraded.

The present inventors have discovered that by providing a matrix-domain structure composed of a matrix including a crystalline resin and domains including an amorphous resin and controlling the presence state of the crystalline resin and the amorphous resin, it is possible to obtain excellent low-temperature fixability, lower the adhesive force while maintaining the electric field driving force, and obtain excellent emboss transferability. As a result of detailed investigation, it was found that the occupied area of the matrix in the cross section of the toner particle and the presence state of the crystalline resin and the amorphous resin on the surface and inside of the toner particle are influential factors.

It is necessary that the toner have a matrix-domain structure composed of a matrix including a crystalline resin and domains including an amorphous resin, and that the area ratio occupied by the matrix in the total area of the matrix and the domains be from 35 area % to 70 area %. Further, it is necessary to set the [hydrocarbon group index (Ge)]/[hydrocarbon group index (DIA)] after washing the toner with hexane to 1.10 or more.

By satisfying these conditions, a large amount of the crystalline resin having high molecular mobility is selectively present on the toner particle surface, so that charge dissipation on the toner particle surface is promoted, the charge quantity on the contact surface is suppressed, and the electrostatic adhesive force can be reduced. Meanwhile, since the electric charges are trapped at the interface between the crystalline resin and the amorphous resin present inside the toner particle and the charge quantity per toner particle can be maintained, the electric field driving force can be maintained. As a result, by using a crystalline resin as the matrix of the matrix-domain structure and selectively enabling the presence of a large amount of matrix on the toner particle surface, a toner is obtained which excels in low-temperature fixability and emboss transferability and in which the electrostatic adhesion force is reduced while maintaining the electric field driving force.

The area ratio occupied by the matrix in the total area of the matrix and the domains is preferably from 40 area % to 60 area %. When the area ratio occupied by the matrix satisfies the above range, the balance between the charge dissipation by the crystalline resin and the charge trapping by the interface between the crystalline resin and the amorphous resin is improved, and the emboss transferability is improved. The area ratio can be controlled by the ratio of the crystalline resin forming the matrix and the amorphous resin forming the domains.

In an ATR (Attenuated Total Reflection) method, a sample is brought into close contact with a crystal (ATR crystal) of higher refractive index than that of the sample, and infrared light is caused to strike the crystal at an incidence angle equal to or greater than a critical angle. Thereupon, the incident light repeatedly undergoes total reflection at the interface between the crystal and the sample closely adhered thereto, and exits then the crystal. Instead of being reflected at the interface between the sample and the crystal, thus, the infrared light becomes totally reflected after having penetrated somewhat into the sample. This penetration depth depends on the wavelength, the incidence angle, and the refractive index of the ATR crystal.

$$d_p = \lambda/(2\pi n_1) \times [\sin^2\theta - (n_1/n_2)^2]^{-1/2}$$

$d_p$: penetration depth $n_1$: refractive index of sample (1.5 in the present disclosure)

$n_2$: refractive index of ATR crystal (4.0 in a case where the ATR crystal is Ge, 2.4 in a case where the ATR crystal is diamond)

θ: incidence angle

Therefore, by changing the refractive index of the ATR crystal and the incident angle, it is possible to obtain FT-IR spectra having different penetration depths. Utilizing this characteristic, the degree of uneven distribution of the matrix including the crystalline resin on the toner particle surface is indexed. As the ATR crystal, a Ge ATR crystal (refractive index: 4.0) and a diamond ATR crystal (refractive index: 2.4) are used. The penetration depth when Ge is used as an ATR crystal is about 200 nm from the sample surface, and the penetration depth when diamond is used is about 700 nm from the sample surface.

The hydrocarbon group index (Ge) is the value of A (Ge)/B (Ge) where A (Ge) is a maximum absorption peak intensity in the range of 2800 $cm^{-1}$ to 2900 $cm^{-1}$ corresponding to a stretching vibration of C—H, and B (Ge) is a maximum absorption peak intensity in the range of 1500 $cm^{-1}$ to 1800 $cm^{-1}$ corresponding to a stretching vibration of, C═O in an FT-IR spectrum obtained by using Ge as an ATR crystal and performing measurements by the ATR method under the condition of an infrared light incident angle being 45°.

The hydrocarbon group index (DIA) is the value of A (DIA)/B (DIA) where A (DIA) is a maximum absorption peak intensity in the range of 2800 $cm^{-1}$ to 2900 $cm^{-1}$ corresponding to the stretching vibration of C—H, and B (DIA) is a maximum absorption peak intensity in the range of 1500 $cm^{-1}$ to 1800 $cm^{-1}$ corresponding to the stretching vibration of C═O, in an FT-IR spectrum obtained by using diamond as an ATR crystal and performing measurements by the ATR method under the condition of an infrared light incident angle being 45°.

The maximum absorption peak intensity in the range of 2800 $cm^{-1}$ to 2900 $cm^{-1}$ corresponding to the stretching vibration of C—H represents the presence of an alkyl group. Further, the maximum absorption peak intensity in the range of 1500 $cm^{-1}$ to 1800 $cm^{-1}$ corresponding to the stretching vibration of C═O represents the presence of a carbonyl group. Therefore, the [hydrocarbon group index (Ge)]/[hydrocarbon group index (DIA)] represents the ratio of the amount of the crystalline resin at a location at a depth of about 200 nm from the toner particle surface to the amount of the crystalline resin at a location at a depth of about 700 nm from the toner particle surface, that is, the degree of uneven distribution of the matrix including the crystalline resin on the toner particle surface.

The [hydrocarbon group index (Ge)]/[hydrocarbon group index (DIA)] after washing the toner with hexane is preferably 1.20 or more. Where the [hydrocarbon group index (Ge)]/[hydrocarbon group index (DIA)] is 1.20 or more, the amount of the crystalline resin present on the toner particle surface increases, the dissipation of electric charges is further promoted, and the emboss transferability is further improved. The upper limit of the [hydrocarbon group index (Ge)]/[hydrocarbon group index (DIA)] is not particularly limited, but is preferably 1.60 or less, and more preferably 1.40 or less.

The [hydrocarbon group index (Ge)]/[hydrocarbon group index (DIA)] can be controlled, for example, by the presence/absence of surface treatment of toner particles by heating, the hot air treatment temperature, the presence/absence of a core-shell structure, and the type and addition amount of a shell agent. Where the hot air treatment temperature is raised, a crystalline resin having a low viscosity is deposited on the surface more, and the [hydrocarbon group index (Ge)]/[hydrocarbon group index (DIA)] becomes large. Further, when an appropriate amount of a crystalline material is used as the shell agent, the [hydrocarbon group index (Ge)]/[hydrocarbon group index (DIA)] becomes large.

In the cross-sectional observation of the toner particle, the number average circle-equivalent diameter of the domains is preferably from 20 nm to 500 nm, and more preferably from 100 nm to 300 nm. When the number average circle-equivalent diameter of the domains satisfies the above range, the dispersibility of the domains in the toner is improved, the charge trapping at the interface between the crystalline resin and the amorphous resin is promoted, and the emboss transferability is improved.

The number average circle-equivalent diameter of the domains can be controlled, for example, by the relationship between the SP value of the resins of the matrix and the domains, the kneading temperature and screw rotation speed in the melt-kneading process, and the stirring rotation speed in the aggregation process. When the SP values of the resins of the matrix and the domains are close to each other, the compatibility between the matrix and the domains increases, and the number average circle-equivalent diameter of the domains becomes small. Further, where the screw rotation speed and the stirring rotation speed are increased, the shearing force with respect to the resin becomes stronger, and the number average circle-equivalent diameter of the domains becomes smaller.

The charge decay rate coefficient of a toner particle measured in an environment of 30° C. and 80% RH is preferably 10 to 70, and more preferably from 20 to 50. Where the charge decay rate coefficient satisfies the above range, the charge dissipation is improved and the emboss transferability is further improved. The charge decay rate coefficient measured in an environment of 30° C. and 80% RH can be controlled by the SP value and molecular structure of the resin, the material composition of the toner particle surface, and the like. Where a large amount of resin having low molecular mobility is present on the toner particle surface, the charge decay rate coefficient becomes small.

A binder resin includes the first resin, and the first resin is a crystalline resin. A known crystalline resin can be used as the crystalline resin. Suitable examples include crystalline vinyl resins, crystalline polyester resins, crystalline polyurethane resins, and crystalline polyurea resins. Other examples include ethylene copolymers such as ethylene-vinyl acetate copolymer, ethylene-methyl acrylate copolymer, ethylene-ethyl acrylate copolymer, ethylene-butyl acrylate copolymer, ethylene-methyl methacrylate copolymer, ethylene-methacrylic acid copolymer, ethylene-acrylic acid copolymer, and the like.

From the viewpoint of low-temperature fixability, crystalline vinyl resins and crystalline polyester resins are preferable. Further, it may be a hybrid resin in which a vinyl resin and a polyester resin are bonded. The first resin preferably includes a vinyl resin, more preferably is a vinyl resin, and preferably has a first monomer unit represented by a following formula (1). The first resin is preferably a vinyl resin having a monomer unit represented by the following formula (1). A vinyl resin is a polymer or copolymer of a compound including a group having an ethylenically unsaturated bond such as a vinyl group. Examples of the group having an ethylenically unsaturated bond include a vinyl group, a (meth)allyl group, and a (meth)acryloyl group.

(1)

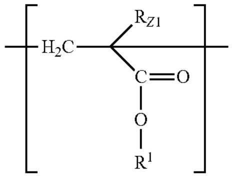

In the formula (1), $R_{Z1}$ represents a hydrogen atom or a methyl group, and $R^1$ represents an alkyl group having from 18 to 36 carbon atoms. The first monomer unit represented by the formula (1) has an alkyl group having from 18 to 36 carbon atoms and represented by $R^1$ in the side chain, and the presence of this portion facilitates the development of crystallinity. The first monomer unit represented by the formula (1) is preferably a monomer unit derived from at least one first polymerizable monomer selected from the group consisting of (meth)acrylic acid esters having an alkyl group having from 18 to 36 carbon atoms.

Where the first resin has the first monomer unit represented by the formula (1), the first resin has a comb-shaped crystal structure, so that the molecular mobility is moderately suppressed, the charge dissipation is improved, and the emboss transferability is further improved.

Examples of (meth)acrylic acid esters each having a $C_{18-36}$ alkyl group include (meth)acrylic acid esters each having a $C_{18-36}$ straight-chain alkyl group [stearyl (meth) acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth) acrylate, myricyl (meth)acrylate, dotriacontyl (meth)acrylate, etc.] and (meth)acrylic acid esters each having a $C_{18-36}$ branched alkyl group [2-decyltetradecyl (meth)acrylate, etc.].

Of these, from the viewpoint of low-temperature fixability, at least one selected from the group consisting of (meth)acrylic acid esters having a linear alkyl group having from 18 to 36 carbon atoms is preferable, at least one selected from the group consisting of (meth)acrylic acid esters having a linear alkyl group having from 18 to 30 carbon atoms is more preferable, and at least one selected from the group consisting of a linear stearyl (meth)acrylate and behenyl (meth)acrylate is even more preferable. As the monomer forming the first monomer unit, one type may be used alone, or two or more types may be used in combination.

Further, the content ratio of the first monomer unit in the first resin is preferably from 30.0% by mass to 80.0% by mass, and more preferably from 40.0% by mass to 70.0% by mass or less. Where the content ratio of the first monomer unit in the first resin satisfies the above range, the charge dissipation is improved and the emboss transferability is further improved. When the crystalline resin has a monomer unit derived from a (meth)acrylic acid ester having two or more kinds of alkyl groups having 18 to 36 carbon atoms, the content ratio of the first monomer unit represents the total mass ratio thereof.

Where the SP value $(J/cm^3)^{0.5}$ of the first monomer unit is denoted by $SP_1$, the $SP_1$ is preferably less than 20.00, more preferably 19.00 or less, and more preferably 18.40 or less. The lower limit is not particularly limited but is preferably 17.00 or more.

Here, the SP value is an abbreviation for the solubility parameter and is an index of solubility. The calculation method thereof will be described hereinbelow. The unit of the SP value is $(J/cm^3)^{0.5}$, but by using 1 $(cal/cm^3)^{0.5}$= $2.045\times10^3$ $(J/cm^3)^{0.5}$, it can be converted to $(cal/cm^3)^{0.5}$.

The first resin preferably has a second monomer unit, which is different from the first monomer unit and is at least one selected from the group consisting of monomer units represented by following formulas (2) and (3). Further, where the SP value of the second monomer unit is denoted by $SP_2$ $(J/cm^3)^{0.5}$, it is preferable that the following relational formula (4) be satisfied. It is more preferable that the following formula (4') be satisfied. The upper limit of $SP_2$ is not particularly limited but is preferably 30.00 or less.

$$21.00\ (J/cm^3)^{0.5} \leq SP_2 \tag{4}$$

$$25.00\ (J/cm^3)^{0.5} \leq SP_2 \tag{4'}$$

Where $SP_2$ of the second monomer unit satisfies the formula (4), the second monomer unit becomes highly polar, and a difference in polarity occurs between the first and second monomer units. Due to this difference in polarity, the crystallization of the first monomer unit is promoted, so that excellent low-temperature fixability can be obtained. Specifically, the first monomer unit is incorporated in the crystalline resin, and the first monomer units are aggregated to develop crystallinity.

Normally, the crystallization of the first monomer unit is inhibited when another monomer unit is incorporated, so that it becomes difficult to develop crystallinity as a crystalline resin. This tendency becomes prominent when a plurality of types of monomer units is randomly bonded to each other in one molecule of the crystalline resin. However, where the first polymerizable monomer having a polarity difference and the second polymerizable monomer forming the second monomer unit are used, it is conceivable that the first polymerizable monomer and the second polymerizable monomer can be bonded continuously to some extent rather than randomly at the time of polymerization.

As a result, blocks in which the first monomer units are aggregated are formed, the crystalline resin becomes a block copolymer, it becomes possible to improve the crystallinity even if other monomer units are incorporated, and excellent low-temperature fixability is obtained.

(2)

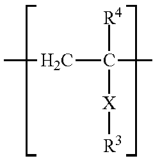

(In the formula (2), X represents a single bond or an alkylene group having from 1 to 6 carbon atoms.

$R^3$ is a nitrile group —C≡N, an amide group —C(═O)$NHR^{10}$ ($R^{10}$ represents a hydrogen atom or an alkyl group having from 1 to 4 carbon atoms), a hydroxy group, —$COOR^{31}$ ($R^{31}$ represents a hydrogen atom, an alkyl group having from 1 to 6 (preferably 1 to 4) carbon atoms or a hydroxyalkyl group having from 1 to 6 (preferably from 1 to 4) carbon atoms), an urea group —NH—C(═O)—$N(R^{33})_2$ (two $R^{33}$s independently represent a hydrogen atom or an alkyl group having from 1 to 6 (preferably from 1 to 4) carbon atoms), —$COO(CH_2)_2NHCOOR^{34}$ ($R^{34}$ represents an alkyl group having from 1 to 4 carbon atoms), or —$COO(CH_2)_2$—NH—C(═O)—$N(R^{35})_2$ (two $R^{35}$s independently represent a hydrogen atom or an alkyl group having from 1 to 6 (preferably from 1 to 4) carbon atoms.

$R^4$ represents a hydrogen atom or a methyl group.)

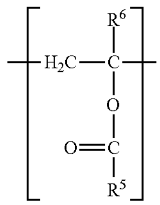

(3)

(In the formula (3), $R^5$ represents an alkyl group having from 1 to 4 carbon atoms, and $R^6$ represents a hydrogen atom or a methyl group.)

Specific examples of the second polymerizable monomer forming the second monomer unit include the polymerizable monomers listed below. Preferably, a polymerizable monomer capable of forming a monomer unit represented by the formula (2) or (3) is used.

A monomer having a nitrile group; for example, acrylonitrile, methacrylonitrile, and the like.

A monomer having a hydroxy group; for example, 2-hydroxyethyl (meth)acrylate, 2-hydroxypropyl (meth)acrylate, and the like.

A monomer having an amide group; for example, acrylamide and a monomer obtained by reacting an amine having from 1 to 30 carbon atoms and a carboxylic acid having from 2 to 30 carbon atoms and an ethylenically unsaturated bond (acrylic acid, methacrylic acid, and the like) by a known method.

A monomer having a urea group; for example, a monomer obtained by reacting an amine having from 3 to 22 carbon atoms [primary amines (normal butylamine, t-butylamine, propylamine, isopropylamine, and the like), secondary amines (dinormalethylamine, dinormalpropylamine, dinormal butylamine, and the like), aniline, cycloxylamine, and the like] with an isocyanate having from 2 to 30 carbon atoms and an ethylenically unsaturated bond by a known method.

A monomer having a carboxy group; for example, methacrylic acid, acrylic acid, and 2-carboxyethyl (meth)acrylate.

Among them, it is preferable to use a monomer having a nitrile group, an amide group, a hydroxy group, or a urea group. More preferably, a monomer having an ethylenically unsaturated bond and at least one functional group selected from the group consisting of a nitrile group, an amide group, a hydroxy group, and a urea group. Acrylonitrile and methacrylonitrile are particularly preferable.

Further, as the second monomer unit, a vinyl ester such as vinyl acetate, vinyl propionate, vinyl butyrate, vinyl caproate, vinyl caprylate, vinyl decanoate, vinyl laurate, vinyl myristate, vinyl palmitate, vinyl stearate, vinyl pivalate, and vinyl octylate is also preferably used. Among them, since vinyl esters are non-conjugated monomers, which tend to maintain appropriate reactivity with the first polymerizable monomer and easily increase the crystallinity of the polymer, vinyl monomers are preferable from the viewpoint of low-temperature fixability.

The content ratio of the second monomer unit in the first resin is preferably from 5.0% by mass to 40.0% by mass, and more preferably from 10.0% by mass to 30.0% by mass.

The first resin may comprise a third monomer unit obtained by polymerization of a third polymerizable monomer, which is not included in the range of the above formula (4) (that is, different from the first polymerizable monomer and the second polymerizable monomer), within a range in which the mass ratio of the first monomer unit and the second monomer unit described above is not impaired. As the third polymerizable monomer, among the monomers exemplified as the second polymerizable monomer, a monomer that does not satisfy the above formula (4) can be used.

For example, the following monomers can also be used. Styrene and derivatives thereof such as styrene, o-methylstyrene and the like, and (meth)acrylic acid esters such as methyl (meth)acrylate, n-butyl (meth)acrylate, t-butyl (meth)acrylate, 2-ethylhexyl (meth)acrylate. Among them, from the viewpoint of charge diffusion, the third polymerizable monomer is preferably styrene. The content ratio of the third monomer unit in the first resin is preferably from 5.0% by mass to 50.0% by mass, and more preferably from 10.0% by mass to 30.0% by mass.

Where the SP value $(J/cm^3)^{0.5}$ of the first monomer unit is denoted by SP3, the SP3 is preferably from 19.00 to 25.00, and more preferably from 19.50 to 21.00.

The binder resin includes a second resin, and the second resin is an amorphous resin. From the viewpoint of charge trapping, the second resin is preferably a polyester resin, a styrene acrylic resin, or a hybrid resin of a polyester resin and a styrene acrylic resin, and more preferably a styrene acrylic resin. As the styrene acrylic resin, a styrene acrylic resin usually used for toner can be suitably used. Examples of the styrene-based monomer include styrene, α-methylstyrene, β-methylstyrene, o-methylstyrene, m-methylstyrene, p-methyl styrene, 2,4-dimethylstyrene, p-n-butylstyrene, p-tert-butyl styrene, p-n-hexyl styrene, p-n-octyl styrene, p-n-nonyl styrene, p-n-decyl styrene, p-n-dodecyl styrene, p-methoxy styrene and p-phenyl styrene. These styrene-based monomers can be used alone or in combination of two or more.

Examples of the (meth)acrylic-based monomer include methyl (meth)acrylate, ethyl (meth)acrylate, n-propyl (meth)acrylate, iso-propyl (meth)acrylate, n-butyl (meth) acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth)acrylic acid, and maleic acid. These (meth)acrylic-based monomers can be used alone or in combination of two or more.

As the polyester resin, a polyester resin usually used for toner can be preferably used. Monomers to be used in the polyester resin include polyhydric alcohols (dihydric or trihydric or higher alcohols), polyvalent carboxylic acids (divalent or trivalent or higher carboxylic acids), acid anhydrides thereof or lower alkyl esters thereof.

Examples of the polyhydric alcohols include the following. Examples of the dihydric alcohol include the following bisphenol derivatives. Polyoxypropylene-(2.2)-2,2-bis(4-hydroxyphenyl)propane, polyoxypropylene-(3.3)-2,2-bis(4-hydroxyphenyl)propane, polyoxyethylene-(2.0)-2,2-bis(4-hydroxyphenyl)propane, polyoxypropylene-(2.0)-polyoxyethylene-(2.0)-2,2-bis(4-hydroxyphenyl)-propane, polyoxypropylene-(6)-2,2-bis(4-hydroxyphenyl)propane, and the like.

Examples of other polyhydric alcohols include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene. These polyhydric alcohols can be used alone or in combination of two or more.

Examples of the polyvalent carboxylic acid include the following. Examples of the divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecyl succinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Of these, maleic acid, fumaric acid, terephthalic acid, and n-dodecenylsuccinic acid are preferably used.

Examples of the trivalent or higher carboxylic acid, acid anhydrides thereof or lower alkyl esters thereof include the following. 1,2,4-Benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimeric acid, acid anhydrides thereof or lower alkyl esters thereof.

Of these, derivatives such as 1,2,4-benzenetricarboxylic acid (trimellitic acid) or an acid anhydride thereof are preferably used because of low cost and easiness of reaction control. These polyvalent carboxylic acids can be used alone or in combination of two or more.

Other Resins

For the purpose of improving pigment dispersibility, the binder resin may include a third resin other than the first resin and the second resin to the extent that the effect of the present disclosure is not impaired. Examples of such resin include the following. Polyvinyl chloride, phenol resin, natural resin-modified phenol resin, natural resin-modified maleic acid resin, polyvinyl acetate, silicone resin, polyester resin, polyurethane resin, polyamide resin, furan resin, epoxy resin, xylene resin, polyvinyl butyral, terpene resin, coumarone-indene resin, and petroleum resin.

Wax

The toner particle may include a wax if necessary. Examples of the wax include the following:

hydrocarbon waxes such as microcrystalline wax, paraffin wax and Fischer-Tropsch wax; oxides of hydrocarbon waxes, such as polyethylene oxide wax, and block copolymers of these; waxes such as carnauba wax consisting primarily of fatty acid esters; and waxes such as deoxidized carnauba wax consisting of partially or fully deoxidized fatty acid esters.

Other examples include the following: saturated straight-chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, ceryl alcohol and melissyl alcohol; fatty acid amides such as linoleamide, oleamide and lauramide; saturated fatty acid bisamides such as methylene bis stearamide, ethylene bis capramide, ethylene bis lauramide and hexamethylene bis stearamide; unsaturated fatty acid amides such as ethylene bis oleamide, hexamethylene bis oleamide, N,N'-dioleyl adipamide and N,N'-dioleyl sebacamide; aromatic bisamides such as m-xylene bis stearamide and N,N'-distearyl isophthalamide; aliphatic metal salts (commonly called metal soaps) such as calcium stearate, calcium laurate, zinc stearate and magnesium stearate; waxes obtained by grafting vinyl monomers such as styrene and acrylic acid onto aliphatic hydrocarbon waxes; partial esterification products of polyhydric alcohols and fatty acids, such as behenic acid monoglyceride; and methyl ester compounds having hydroxy groups obtained by hydrogenation of plant-based oils and fats.

The wax preferably includes a hydrocarbon wax. The wax content is preferably from 2.0 parts by mass to 30.0 parts by mass with respect to 100 parts by mass of the binder resin.

Colorant

The toner particle may also comprise a colorant. Examples of colorants include the following.

Examples of black colorants include carbon black and blacks obtained by blending yellow, magenta and cyan colorants. A pigment may be used alone as a colorant, but combining a dye and a pigment to improve the sharpness is desirable from the standpoint of the image quality of full-color images.

Examples of pigments for magenta toners include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. pigment violet 19; and C.I. vat red 1, 2, 10, 13, 15, 23, 29 and 35.

Examples of dyes for magenta toners include C.I. solvent red 1, 3, 8, 23, 24, 25, 27, 30, 49, 81, 82, 83, 84, 100, 109 and 121; C.I. disper red 9; C.I. solvent violet 8, 13, 14, 21, 27; oil-soluble dyes such as C.I. disperse violet 1, and C.I. basic red 1, 2, 9, 12, 13, 14, 15, 17, 18, 22, 23, 24, 27, 29, 32, 34, 35, 36, 37, 38, 39 and 40; and basic dyes such as C.I. basic violet 1, 3, 7, 10, 14, 15, 21, 25, 26, 27 and 28.

Examples of pigments for cyan toners include C.I. pigment blue 2, 3, 15:2, 15:3, 15:4, 16, and 17; C. I. vat blue 6; and C.I. acid blue 45 and copper phthalocyanine pigments having 1 to 5 phthalimidomethyl substituents in the phthalocyanine framework. Examples of dyes for cyan toners include C.I. solvent blue 70.

Examples of pigments for yellow toners include C.I. pigment yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. vat yellow 1, 3 and 20. Examples of dyes for yellow toners include C.I. solvent yellow 162.

These colorants can be used alone or in admixture, and even in the form of a solid solution. The colorant is selected from the viewpoint of hue angle, saturation, lightness, light resistance, OHP transparency, and dispersibility in toner. The content of the colorant is preferably from 0.1 part by mass to 30.0 parts by mass with respect to 100 parts by mass of the binder resin.

Charge Control Agent

If necessary, the toner particle may include a charge control agent. By blending a charge control agent, it is possible to stabilize the charge characteristics and control the optimum triboelectric charge quantity according to the developing system. As the charge control agent, known ones can be used, but a metal compound of an aromatic carboxylic acid, which is colorless, has a high charging speed of the toner, and can stably maintain a constant charge quantity, is particularly preferable.

Examples of negative charge control agents include metal compounds of salicylic acid, metal compounds of naphthoic acid, metal compounds of dicarboxylic acids, polymer compounds having a sulfonic acid or a carboxylic acid in a side chain, polymer compounds having a sulfonic acid salt or a sulfonic acid esterification product in a side chain, polymer compounds having a carboxylic acid salt or a carboxylic acid esterification product in a side chain, boron compounds, urea compounds, silicon compounds, and calixarenes.

The charge control agent may be added internally or externally to the toner particle. The content of the charge control agent is preferably from 0.2 parts by mass to 10.0 parts by mass, and more preferably from 0.5 parts by mass to 10.0 parts by mass with respect to 100 parts by mass of the binder resin.

Inorganic Fine Particles

If necessary, the toner may include inorganic fine particles. The inorganic fine particles may be internally added to the toner particle or may be mixed with the toner as an external additive. Examples of the inorganic fine particles include fine particles such as silica fine particles, titanium oxide fine particles, alumina fine particles, and complex oxide fine particles thereof. Among the inorganic fine particles, silica fine particles and titanium oxide fine particles are preferable for fluidity improvement and charge homogenization. The inorganic fine particles are preferably hydrophobized with a hydrophobizing agent such as a silane compound, silicone oil or a mixture thereof.

From the viewpoint of improving flowability, the inorganic fine particles as an external additive preferably have a specific surface area of from 50 $m^2/g$ to 400 $m^2/g$. Further, from the viewpoint of improving durability stability, the inorganic fine particles as an external additive preferably have a specific surface area of from 10 $m^2/g$ to 50 $m^2/g$. Inorganic fine particles having a specific surface area in the above ranges may be used in combination in order to achieve both improved flowability and durability stability.

The content of the external additive is preferably from 0.1 part by mass to 10.0 parts by mass with respect to 100 parts by mass of the toner particles. A known mixer such as a Henschel mixer can be used for mixing the toner particles and the external additive.

Developer

Although the toner can be used as a one-component developer, it is more preferable to use it as a two-component developer by mixing with a magnetic carrier because a stable image can be obtained for a long period of time.

Examples of the magnetic carrier include generally known materials such as iron powder with oxidized surface, unoxidized iron powder, metal particles such as iron, lithium, calcium, magnesium, nickel, copper, zinc, cobalt, manganese, and rare earth, and alloys thereof, magnetic bodies such as ferrites, magnetic body-dispersed resin carriers (so-called resin carriers) including magnetic bodies and a binder resin that holds the magnetic bodies in a dispersed state, and the like.

Where the toner is mixed with a magnetic carrier and used as a two-component developer, usually good results are obtained when the carrier mixing ratio at that time is preferably from 2.0% by mass to 15.0% by mass, and more preferably from 4.0% by mass to 13.0% by mass as the toner concentration in the two-component developer.

Method for Producing the Toner

A method for producing the toner is not particularly limited, and known methods such as a pulverization method, a suspension polymerization method, a dissolution suspension method, an emulsion and aggregation method, and a dispersion polymerization method can be used. Hereinafter, the toner production procedure by the pulverization method will be described.

Raw Material Mixing Step

In a raw material mixing step, for example, a binder resin, and if necessary other components such as a wax, a colorant, a charge control agent, and the like are weighed and blended in predetermined amounts as materials constituting the toner particle. Examples of the mixing device include a double-cone mixer, a V-type mixer, a drum-type mixer, a Super mixer, a Henschel mixer, a Nauta mixer, a Mechanohybrid (manufactured by Nippon Coke Industries, Ltd.), and the like.

Melt-Kneading Step

Next, the mixed material is melt-kneaded to disperse the wax and the like in the binder resin. In the melt-kneading step, a batch-type kneader such as a pressurization kneader or a Banbury mixer or a continuous-type kneader can be used, and a single-screw or twin-screw extruder has become the mainstream because of the advantage of continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Iron Works Co., Ltd.), a twin-screw extruder (manufactured by Kabushiki Kaisha KCK), a co-kneader (manufactured by Buss AG), Kneedex (manufactured by Nippon Coke Industries Co., Ltd.), and the like. Further, the resin composition obtained by melt-kneading may be rolled with two rolls or the like and cooled with water or the like in the cooling step.

It is possible to control the dispersed state of the first resin and the second resin, the number average diameter of domains, and the like by the kneading temperature in the melt-kneading step, the rotation speed of the screw, and the like.

Pulverization Step

Then, the cooled product of the resin composition is pulverized to a desired particle diameter in the pulverization step. In the pulverization step, after coarse pulverization with a pulverizer such as a crusher, a hammer mill, or a feather mill, further, fine pulverization is performed with, for example, a Cryptron system (manufactured by Kawasaki Heavy Industries, Ltd.), a SuperRotor (manufactured by Nisshin Engineering Co., Ltd.), a turbo mill (manufactured by Turbo Industries Co., Ltd.) or fine pulverizer by an air jet system.

Classification Step

After that, if necessary, classification is performed with a classifier or sieve such as inertial classification type Elbow Jet (manufactured by Nittetsu Mining Co., Ltd.), centrifugal force classification type Turboplex (manufactured by Hosokawa Micron Corporation), TSP separator (manufactured by Hosokawa Micron Corporation), Faculty (manufactured by Hosokawa Micron Corporation), and the like.

Thermal Spheroidizing Treatment Step

If necessary, surface treatment of toner particles such as spheroidizing treatment can be also performed after pulverization by using a hybridization system (manufactured by Nara Machinery Co., Ltd.), a Mechanofusion system (manufactured by Hosokawa Micron Corporation), Faculty (manufactured by Hosokawa Micron Corporation), and Meteo Rainbow MR Type (manufactured by Nippon Pneumatic MFG Co., Ltd.).

In particular, surface treatment of toner particles by heating is preferable from the viewpoint of facilitating control of the [hydrocarbon group index (Ge)]/[hydrocarbon group index (DIA)] because a crystalline resin having a low viscosity is deposited on the surface. Further, since the surface treatment of the toner particles by heating is performed in a hydrophobic field, a highly hydrophobic material is oriented to the surface, which is preferable from the viewpoint of controlling the dissipation of electric charges. For example, the surface treatment can be performed by hot air using the thermal spheroidizing treatment apparatus shown in the FIGURE. That is, the toner particles are preferably pulverized toner particles, and more preferably heat-treated products of the pulverized toner particles. The method for manufacturing the toner preferably includes a step of surface-treating the toner particles with hot air to obtain heat-treated toner particles.

In the FIGURE, a mixture quantitatively supplied by a raw material quantitative supply means 1 is guided by the compressed gas adjusted by a compressed gas adjusting means 2 to an introduction pipe 3 installed on the central axis of a treatment chamber 6. The mixture that has passed through the introduction pipe is uniformly dispersed by a conical protruding member 4 provided in the central portion of the raw material supply means, and the mixture is then guided to an eight-direction supply pipe 5 that spreads radially and is guided from a powder particle supply port 14 to the treatment chamber 6 where the heat treatment is performed.

At this time, the flow of the mixture supplied to the treatment chamber 6 is regulated by a regulating means 9 for regulating the flow of the mixture provided in the treatment chamber 6. Therefore, the mixture supplied to the treatment chamber 6 is heat-treated while swirling in the treatment chamber 6, and then cooled.

The hot air for heat-treating the supplied mixture is supplied from a hot air supply means 7, and is introduced by spirally swirling the hot air into the treatment chamber 6 by a swirling member 13 for swirling the hot air. In a possible configuration, the swirling member 13 for swirling the hot air has a plurality of blades, and the swirling of the hot air can be controlled by the number and angle of the blades. At this time, a substantially conical distribution member 12 can reduce the deviation of the swirled hot air.

The temperature of the hot air supplied into the treatment chamber 6 at a hot air outlet portion 11 of the hot air supply means 7 is preferably 100° C. to 300° C., and more preferably 105° C. to 200° C. When the temperature at the hot air outlet portion 11 of the hot air supply means 7 is within the above range, the toner particles can be uniformly spheroidized while preventing the fusion and coalescence of the toner particles due to overheating of the mixture. This is preferable because the emboss transferability becomes better.

Further, the heat-treated toner particles subjected to the heat treatment are cooled by the cold air supplied from a cold air supply means 8 (8-1, 8-2, 8-3), and the temperature of the cold air supplied from the cold air supply means 8 is preferably −20° C. to 30° C. Where the temperature of the cold air is within the above range, the heat-treated toner particles can be efficiently cooled, and fusion or coalescence of the heat-treated toner particles can be prevented without inhibiting uniform spheroidization of the mixture. The absolute moisture content of the cold air is preferably from 0.5 $g/m^3$ to 15.0 $g/m^3$.

Next, the cooled heat-treated toner particles are collected by a collection means 10 at the lower end of the treatment chamber 6. A blower (not shown) is provided at the end of the collection means 10 and configured to ensure suction and transportation of the toner particles.

Further, a powder particle supply port 14 is provided such that the swirling direction of the supplied mixture and the swirling direction of the hot air are the same, and the collection means 10 is provided on the outer periphery of the treatment chamber 6 so as to maintain the swirling direction of the swirled powder particles. Furthermore, the cold air supplied from the cold air supply means 8 is supplied horizontally and tangentially from the outer peripheral portion of the apparatus to the peripheral surface of the treatment chamber 6.

The swirling direction of the toner particles supplied from the powder particle supply port 14, the swirling direction of the cold air supplied from the cold air supply means 8, and the swirling direction of the hot air supplied from the hot air supply means 7 are all the same. Therefore, no turbulent flow occurs in the treatment chamber 6, the swirling flow in the apparatus is enhanced, strong centrifugal force is applied to the toner particles, and the dispersibility of the toner particles is further improved. As a result, toner particles including few coalesced particles and having uniform shape can be obtained.

External Addition Step

The obtained toner particles may be used as they are as a toner. If necessary, the toner particle surface may be externally treated with an external additive to obtain toner. As a method for externally adding an external additive, predetermined amounts of classified toner and various known external additives are blended and then stirred and mixed by using a mixing device such as a double-cone mixer, a V-type mixer, a drum-type mixer, SuperMixer, a Henschel mixer, a Nauta mixer, Mechanohybrid (manufactured by Nippon Coke Industries Co., Ltd.), Nobilta (manufactured by Hosokawa Micron Corporation), and the like as an external mixer.

Further, a case where toner particles are manufactured by the emulsion and aggregation method will be described. In the emulsion and aggregation method, toner particles are manufactured through a dispersion step of producing a fine particle-dispersed solution composed of constituent materials of toner particles, an aggregation step of aggregating fine particles composed of constituent materials of toner particles, and controlling the particle diameter until the particle diameter of the toner particles is reached, a fusion step of fusing the resin contained in the obtained aggregated particles, a subsequent cooling step, a metal removal step of separating the obtained toner and removing excess polyvalent metal ions, a filtering and washing step of washing with ion-exchanged water, and a step of removing water from the washed toner particles and drying.

Step of Preparing Resin Fine Particle-Dispersed Solution (Dispersion Step)

The resin fine particle-dispersed solution can be prepared by known methods, but is not limited to these methods. Examples of known methods include, for example, an emulsion polymerization method, a self-emulsifying method, a phase inversion emulsification method in which a resin is emulsified by adding an aqueous medium to a resin solution obtained by dissolution in an organic solvent, or a forced emulsification method in which an organic solvent is not used and a resin is forcibly emulsified by high-temperature treatment in an aqueous medium.

Specifically, a binder resin such as the first resin and the second resin is dissolved in an organic solvent capable of dissolving the resin, and a surfactant or a basic compound is added as necessary. At that time, where the binder resin is a crystalline resin having a melting point, the resin may be melted by heating above the melting point. Subsequently, the aqueous medium is slowly added while stirring with a homogenizer or the like to precipitate the resin fine particles. Then, the solvent is removed by heating or reducing the pressure to prepare an aqueous dispersion liquid of resin fine particles. As the organic solvent used to dissolve the resin, any organic solvent that can dissolve the resin can be used, but from the viewpoint of suppressing the generation of coarse powder, it is preferable to use an organic solvent that forms a uniform phase with water such as toluene.

The surfactant to be used at the time of emulsification is not particularly limited, and examples thereof include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like. The surfactants may be used alone or in combination of two or more.

Examples of the basic compound to be used in the dispersion step include an inorganic base such as sodium hydroxide, potassium hydroxide, and the like; and an organic base such as ammonia, triethylamine, trimethylamine, dimethylaminoethanol, diethylaminoethanol, and the like. The basic compounds may be used alone or in combination of two or more.

Further, the 50% particle diameter (D50) of the binding resin fine particles in the aqueous dispersion of the resin fine particles based on the volume distribution is preferably 0.05 μm to 1.00 and more preferably 0.05 μm to 0.40 By adjusting the 50% particle diameter (D50) based on the volume distribution to the above range, it becomes easy to obtain toner particles having a weight average particle diameter of 3 to 10 which is appropriate for toner particles. A dynamic light scattering type particle diameter distribution meter Nanotrack UPA-EX150 (manufactured by Nikkiso Co., Ltd.) is used to measure the 50% particle diameter (D50) based on the volume distribution.

Colorant Fine Particle-Dispersed Solution

The colorant fine particle-dispersed solution to be used as needed can be prepared by the known method described hereinbelow, but is not limited to this method. Thus, the colorant fine particle-dispersed solution can be prepared by mixing a colorant, an aqueous medium and a dispersant with a mixer such as a known stirrer, emulsifier, and disperser. As the dispersant used here, known substances such as a surfactant and a polymer dispersant can be used. Both the surfactant and the polymer dispersant can be removed in the washing step described hereinbelow, but the surfactant is preferable from the viewpoint of washing efficiency.

Examples of the surfactant include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like. Among these, nonionic surfactants and anionic surfactants are preferable. Further, a nonionic surfactant and an anionic surfactant may be used in combination. The surfactants may be used alone or in combination of two or more. The concentration of the surfactant in the aqueous medium is preferably 0.5% by mass to 5% by mass.

The amount of the colorant fine particles in the colorant fine particle-dispersed solution is not particularly limited, but is preferably 1% by mass to 30% by mass with respect to the total mass of the colorant fine particle-dispersed solution. Further, as for the dispersed particle diameter of the colorant fine particles in the aqueous dispersion of the colorant, from the viewpoint of dispersibility of the colorant in the finally obtained toner particle, the 50% particle diameter (D50) based on the volume distribution is preferably 0.50 μm or less. For the same reason, it is preferable that the 90% particle diameter (D90) based on the volume distribution be 2 μm or less. The dispersed particle diameter of the colorant fine particles dispersed in the aqueous medium is measured by a dynamic light scattering type particle diameter distribution meter (Nanotrack UPA-EX150: manufactured by Nikkiso Co., Ltd.).

Examples of a mixer such as a known stirrer, emulsifier, and disperser to be used to disperse the colorant in an aqueous media include an ultrasonic homogenizer, a jet mills, a pressure homogenizer, a colloid mill, a ball mill, a sand mill, and a paint shaker. These may be used alone or in combination.

Wax Fine Particle-Dispersed Solution

If necessary, a wax fine particle-dispersed solution may be used. The wax fine particle-dispersed solution can be prepared by the known method described below, but is not limited to this method. The wax fine particle-dispersed solution can be produced by adding wax to an aqueous medium including a surfactant, heating above the melting point of the wax, dispersing into a particulate form with a homogenizer having a strong shearing ability (for example, "CLEARMIX W MOTION" manufactured by M-Technique Co., Ltd. and a pressure discharge type disperser (for example, "GAULIN HOMOGENIZER" manufactured by Gaulin Co., Ltd.), and then cooling to a temperature below the melting point.

As for the dispersed particle diameter of the wax fine particle-dispersed solution in the aqueous wax-dispersed solution, the 50% particle diameter (D50) based on the volume distribution is preferably 0.03 μm to 1.0 and more preferably 0.10 to 0.50 Further, it is preferable that there are no coarse particles of 1 μm or more.

When the dispersed particle diameter of the wax fine particle-dispersed solution is within the above range, the wax can be present in the toner particle in a finely dispersed state, the exuding effect at the time of fixing is maximized, and good separability can be obtained. The dispersed particle diameter of the wax fine particle-dispersed solution obtained by dispersing in the aqueous medium can be measured with a dynamic light scattering type particle diameter distribution meter (Nanotrack UPA-EX150: manufactured by Nikkiso).

Mixing Step

In the mixing step, a mixed liquid in which the first resin fine particle-dispersed solution, the second resin fine particle-dispersed solution, and if necessary, the wax fine particle-dispersed solution and the colorant fine particle-dispersed solution are mixed is prepared. This can be done using a known mixing device such as a homogenizer and a mixer.

Step of Forming Aggregate Particles (Aggregation Step)

In the aggregation step, the fine particles contained in the mixed solution prepared in the mixing step are aggregated to form aggregates having a target particle diameter. At this time, an aggregate in which resin fine particles and, if necessary, wax fine particles, colorant fine particles, and the like are aggregated is formed by adding and mixing a flocculant as necessary and adding, as appropriate, at least one of heating and mechanical power. By adjusting the mechanical power, it is possible to control the dispersed state of the first resin and second resin, the number average diameter of domains, and the like.

As the flocculant, a flocculant including a metal ion having a valence of two or more may be used, if necessary. The flocculant including a metal ion having a valence of two or more has a high cohesive force, and the purpose can be achieved by adding a small amount of the flocculant. These flocculants can also ionically neutralize the ionic surfactant contained in the resin fine particle-dispersed solution, the wax fine particle-dispersed solution, and the colorant fine particle-dispersed solution. As a result, resin fine particles, wax fine particles, and colorant fine particles are likely to be aggregated due to the effects of salting out and ion crosslinking.

In the aggregation step, a resin fine particle-dispersed solution may be newly added, if necessary, after the aggregates are formed. A core-shell structure can be realized by newly adding a resin fine particle-dispersed solution and aggregating. The [hydrocarbon group index (Ge)]/[hydrocarbon group index (DIA)] can be controlled by adjusting the material to be used for the shell and the amount added. When an appropriate amount of crystalline resin is used as a shelling agent, the [hydrocarbon group index (Ge)]/[hydrocarbon group index (DIA)] becomes larger, and when an appropriate amount of amorphous resin is used, the [hydrocarbon group index (Ge)]/[hydrocarbon group index (DIA)] becomes smaller.

The aggregation step is a step of forming a toner particle-sized aggregate in an aqueous medium. The weight average particle diameter of the aggregate produced in the aggregation step is preferably 3 μm to 10 The weight average particle diameter can be measured with a particle diameter distribution analyzer (Coulter Multisizer III: manufactured by Beckman Coulter, Inc.) based on the Coulter method.

Fusion Step

In the fusion step, an aggregation terminator may be added, under the same stirring as in the aggregation step, to the dispersion liquid including the aggregates obtained in the aggregation step. Examples of the aggregation terminator include basic compounds that shift the equilibrium of the acidic polar group of the surfactant to the dissociation side and stabilize the aggregated particles. Other examples include a chelating agent and the like that stabilize aggregated particles by partially dissociating the ion crosslink between the acidic polar group of the surfactant and the metal ion as the flocculant and forming a coordinate bond with the metal ion.

After the dispersed state of the aggregated particles in the dispersion liquid is stabilized by the action of the aggregation terminator, the aggregated particles may be fused by heating to a temperature equal to or higher than the glass transition temperature or melting point of the binder resin. It is also possible to control the number average diameter of domains by adjusting the temperature at the time of fusion. The weight average particle diameter of the obtained toner particles is preferably about 3 μm to about 10 μm.

Filtration Step, Washing Step, Drying Step, and Classification Step

After that, a filtration step for filtering out the solid content of the toner particles and optionally a washing step, a drying step, and a classification step for adjusting the particle diameter are performed to obtain toner particles. The obtained toner particles may be used as they are as a toner. Inorganic fine particles and, if necessary, other external additives may be mixed with the obtained toner particles to obtain a toner. Mixing of toner particles with inorganic fine particles and other external additives is possible with a mixing device such as a double-cone mixer, a V-type mixer, a drum-type mixer, a Super mixer, a Henschel mixer, a Nauta mixer, a Mechano hybrid (manufactured by Nippon Coke Industries Co., Ltd.), and Nobilta (manufactured by Hosokawa Micron Corporation).

Methods for measuring various physical properties will be explained hereinbelow.

Separation of Toner Particles from Toner

Toner particles can be separated from the toner by the following method.

A total of 200 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of CONTAMINON N (a 10% by mass aqueous solution of a neutral detergent for washing precision measuring instruments that has a pH of 7 and includes a nonionic surfactant, an anionic surfactant, and an organic builder; manufactured by Wako Pure Chemical Industries, Ltd.) are placed in a centrifuge tube, and a dispersion liquid is produced. A total of 1 g of toner is added to the dispersion liquid, and the toner lumps are loosened with a spatula or the like.

The centrifuge tube is shaken with a shaker ("KM Shaker" (model: V. SX) manufactured by Iwaki Sangyo Co., Ltd.) for 20 min under the condition of 350 reciprocations per minute. After shaking, the solution is transferred to a glass tube (50 mL) for a swing rotor, and centrifugation is performed at 3500 rpm for 30 min with a centrifuge. In the glass tube after centrifugation, toner particles are present in the uppermost layer, and inorganic fine particles are present on the aqueous solution side of the lower layer. The toner particles in the top layer are collected.

Method for Separating Materials from Toner

Each of the materials contained in the toner can be separated from the toner using the differences among the materials in solubility in solvents.

First separation: The toner is dissolved in 23° C. methyl ethyl ketone (MEK), and the soluble component (second resin) is separated from the insoluble components (first resin, wax, colorant, inorganic fine particle, etc.).

Second separation: The insoluble components obtained in the first separation (first resin, wax, colorant, inorganic fine particle, etc.) are dissolved in 100° C. MEK, and the soluble components (first resin, wax) are separated from the insoluble components (colorant, inorganic fine particle, etc.).

Third separation: The soluble components (first resin, wax) obtained in the second separation are dissolved in 23° C. chloroform and separated into a soluble component (first resin) and an insoluble component (wax).

(When a Third Resin is Included)

First separation: The toner is dissolved in 23° C. methyl ethyl ketone (MEK), and the soluble components (second resin, third resin) are separated from the insoluble components (first resin, wax, colorant, inorganic fine particle, etc.).

Second separation: The soluble components (second resin, third resin) obtained in the first separation are dissolved in 23° C. toluene and separated into a soluble component (third resin) and an insoluble component (second resin).

Third separation: The insoluble components (first resin, wax, colorant, inorganic fine particle, etc.) obtained in the first separation are dissolved in 100° C. MEK and separated into soluble components (first resin, wax) and insoluble components (colorant, inorganic fine particle, etc.).

Fourth separation: The soluble components (first resin, wax) obtained in the third separation are dissolved in 23° C. chloroform and separated into a soluble component (first resin) and an insoluble component (wax).

(Measuring Contents of First Resin and Second Resin in Binder Resin in Toner)

The masses of the soluble components and insoluble components obtained in the separation steps above are measured to calculate the contents of the first resin and second resin in the binder resin in the toner.

Method for Identifying and Measuring the Content Ratio of Each Monomer Unit Constituting the First, Second and Third Resins Identification and measurement of the content ratio of each monomer unit in the resin are performed under the following conditions by $^1$H-NMR.

- Measuring device: FT NMR device JNM-EX400 (manufactured by JEOL Ltd.)
- Measurement frequency: 400 MHz
- Pulse condition: 5.0 μs
- Frequency range: 10500 Hz
- Total number of times: 64 times
- Measurement temperature: 30° C.
- Sample: prepared by placing 50 mg of the measurement sample in a sample tube with an inner diameter of 5 mm, adding deuterated chloroform ($CDCl_3$) as a solvent, and dissolving in an autoclave at 40° C.

By using the obtained $^1$H-NMR chart, from the peaks attributed to the components of the first monomer unit, a peak independent of the peaks attributed to the components of the other monomer units is selected, and the integrated value $S_1$ of the selected peak is calculated. Similarly, from the peaks attributed to the components of the second monomer unit, a peak independent of the peaks attributed to the components of the other monomer units is selected, and the integrated value $S_2$ of the selected peak is calculated.

Further, when the resin has a third monomer unit, from the peaks attributed to the components of the third monomer unit, a peak independent of the peaks attributed to the components of other monomer units is selected, and the integrated value $S_3$ of the selected peak is calculated.

The content ratio of the first monomer unit is determined as follows using the above integrated values $S_1$, $S_2$ and $S_3$. Here, $n_1$, $n_2$, and $n_3$ are the number of hydrogen atoms in the component to which the peak of interest is attributed for each segment.

$$\text{Content ratio of the first monomer unit (mol \%)}=\{(S_1/n_1)/((S_1/n_1)+(S_2/n_2)+(S_3/n_3))\}\times 100$$

Similarly, the content ratios of the second monomer unit and the third monomer unit are calculated as follows.

$$\text{Content ratio of the second monomer unit (mol \%)}=\{(S_2/n_2)/((S_1/n_1)+(S_2/n_2)+(S_3/n_3))\}\times 100$$

$$\text{Content ratio of the third monomer unit (mol \%)}=\{(S_3/n_3)/((S_1/n_1)+(S_2/n_2)+(S_3/n_3))\}\times 100$$

When a polymerizable monomer that does not contain a hydrogen atom is used in the resin as a component other than the vinyl group, the measurement nucleus is set to $^{13}$C using $^{13}$C-NMR, the measurement is performed in the single pulse mode, and the calculation is performed in the same manner as in $^1$H-NMR. Conversion from mol % to mass % can be performed based on the molecular weight of the monomer unit.

Peak Top Temperature Measurement Method of Endothermic Peak Measured by Differential Scanning calorimetry (DSC)

The peak top temperature of the endothermic peak measured by the differential scanning calorimetry method (DSC) for resins and waxes is measured based on ASTM D3418-82 using the differential scanning calorimetry device "Q2000" (manufactured by TA Instruments). The melting points of indium and zinc are used for temperature correction of the device detection unit, and the heat of fusion of indium is used for correcting the calorific value. Specifically, 3 mg of the sample is precisely weighed, placed in an aluminum pan, and measured under the following conditions using an empty aluminum pan as a reference.

- Temperature rise rate: 10° C./min
- Measurement start temperature: 30° C.
- Measurement end temperature: 180° C.

Measurement is performed at a heating rate of 10° C./min within the measurement range of 30° C. to 180° C. The temperature is once raised to 180° C. and held for 10 min, lowered to 30° C., and then raised again. In this second temperature rise process, the peak top temperature of the sample is calculated from the temperature—heat absorption curve in the temperature range of 30° C. to 80° C.

Observation of Toner Cross Section, Measurement of Matrix-Domain Structure

Sections are first prepared as reference samples of abundance. The first resin (crystalline resin) is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. A sample of the second resin (amorphous resin) is prepared in the same way.

The first resin and second resin are mixed at ratios of 30/70 and 70/30, and melt kneaded to prepare kneaded mixtures. These are similarly dispersed in visible light curable resin and cut to prepare sample sections.

Next, these reference samples are observed in cross-section by TEM-EDX using a transmission electron microscope (JEOL Ltd., JEM-2800 electron microscope), and element mapping is performed by EDX. The mapped elements are carbon, oxygen and nitrogen. The mapping conditions are as follows.

Acceleration voltage: 200 kV

Electron beam exposure size: 1.5 nm

Live time limit: 600 sec

Dead time: 20 to 30

Mapping resolution: 256×256

(Oxygen element intensity/carbon element intensity) and (nitrogen element intensity/carbon element intensity) are calculated based on the spectral intensities of each element (average in 10 nm-square area), and calibration curves are prepared for the mass ratios of the first and second resin. When the monomer units of the first resin contain nitrogen, the subsequent assay is performed using the (nitrogen element intensity/carbon element intensity) calibration curve.

The toner samples are then analyzed. The toner is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. The cut sample is then observed by TEM-EDX using a transmission electron microscope (JEOL Ltd., JEM-2800 electron microscope). A cross-sectional image of the toner particle is obtained, and element mapping is performed by EDX. The mapped elements are carbon, oxygen and nitrogen.

Toner particle cross-sections for observation are selected as follows. The cross-sectional area of the toner particle is first determined from the cross-sectional image, and the diameter of a circle having the same area as the cross-sectional area (circle equivalent diameter) is determined. Observation is limited to toner particle cross-section images in which the absolute value of the difference between the circle equivalent diameter and the weight-average particle diameter (D4) is within 1.0 μm. For the domains confirmed in the observed image, (oxygen element intensity/carbon element intensity) and/or (nitrogen element intensity/carbon element intensity) are calculated based on the spectrum intensities of each element (average of 10 nm square), and the ratios of the first and second resins are calculated based on a comparison with the calibration curves. A domain in which the ratio of the second resin is at least 80% is considered a domain in the present disclosure.

When the ratio of the toner particle cross section forming the matrix-domain structure in the toner particle cross section is 80% by number or more, it is determined that the toner particle cross section has the matrix-domain structure in the toner to be measured. The matrix-domain structure is a state in which domains that are a discontinuous phase are dispersed in a matrix that is a continuous phase. Here, it is determined that the first resin or the second resin is the continuous phase when 90 area % or more of the area of the first resin or the area occupied by the second resin in the toner particle cross section is present as one continuous region.

After identifying the domains confirmed by the observation image, the particle diameter of the domains present in the toner particle cross section is obtained by the binarization process. The particle diameter is the circle-equivalent diameter of the domain. This is measured at 10 points per one toner particle, and the arithmetic average value of the domain particle diameter of 10 toner particles is defined as the number average circle-equivalent diameter (μm) of the domains.

Meanwhile, for the domain area, the total area is calculated by summing up the areas of all the domains present in one toner particle cross-sectional image, and this is denoted by S1. The total area of the domains of 100 toner particles (that is, S1+S2 . . . +S100) is calculated, and the arithmetic average value of 100 values is defined as the "domain area".

For the area of the cross section of the toner particle, the total cross-sectional area of the toner particles (for 100 toner particles) obtained from the toner cross-sectional image used when determining the domain area is obtained, and the arithmetic average value is calculated as the "total area of toner particle cross section". Further, "total area of toner particle cross section"−"domain area" is defined as a "matrix area". Then, "matrix area"/("domain area"+"matrix area")×100 is defined as the area ratio occupied by the matrix in the total area of the matrix and the domains combined. The image processing software "ImageJ" is used for the binarization processing and the calculation of the number average diameter.

Measurement of [Hydrocarbon Group Index (Ge)]/[Hydrocarbon Group Index (DIA)]

First, the toner is washed with hexane to remove low-molecular-weight materials such as wax and the like.

(1) A total of 30 mL of hexane is poured in a 100 mL flat-bottomed beaker made of glass.

(2) A predetermined amount of water is poured in a water tank of an ultrasonic disperser "Ultrasonic Dispersion System Tetora 150" (manufactured by Nikkaki Bios Co., Ltd.) in which two oscillators with an oscillation frequency of 50 kHz are incorporated with the phase shifted by 180 degrees and which has an electrical output of 120 W.

(3) The beaker of (1) above is set in the beaker fixing hole of the ultrasonic disperser, and the ultrasonic disperser is operated. The height position of the beaker is adjusted so that the resonance state of the liquid level of the electrolytic solution in the beaker is maximized.

(4) While the beaker of (3) above is irradiated with ultrasonic waves, 10 mg of toner is added little by little and dispersed. Then, the ultrasonic dispersion processing is continued for another 5 min. For ultrasonic dispersion, the water temperature in the water tank is adjusted, as appropriate, to be from 10° C. to 40° C.

(5) The dispersion liquid obtained in (4) above is filtered through a vacuum filter and dried in a dryer for 3 h or more to obtain a toner washed with hexane.

The FT-IR spectrum is measured by an ATR method using a Fourier transform infrared spectroscopic analyzer (Spectrum One: manufactured by PerkinElmer Corp.) equipped with a universal ATR measurement accessory (Universal ATR Sampling Accessory). The specific measurement procedure and the calculation method of the [hydrocarbon group index (Ge)]/[hydrocarbon group index (DIA)] are as follows. The incident angle of infrared light (λ=5 μm) is set to 45°. As the ATR crystal, a Ge ATR crystal (refractive index: 4.0) and a diamond ATR crystal (refractive index: 2.4) are used. Other conditions are as follows. The measurement site when Ge is used as an ATR crystal is about 200 nm from the sample surface, and the measurement site when diamond is used is about 700 nm from the sample surface.

Range

Start: 4000 $cm^{-1}$

End: 600 $cm^{-1}$ (Ge ATR crystal)

400 $cm^{-1}$ (ATR crystal of diamond)

Duration

Scan number: 16

Resolution: 4.00 $cm^{-1}$

Advanced: with $CO_2$/$H_2O$ correction

Method for Calculating Hydrocarbon Group Index (Ge)

(1) The Ge ATR crystal is attached to the device.

(2) Scan type is set to Background and Units to EGY, and the background is measured.

(3) Scan type is set to Sample and Units to A.

(4) A total of 0.01 g of toner is weighed on the ATR crystal.

(5) The sample is pressurized with a pressure arm (Force Gauge is 90).

(6) The sample is measured.

(7) The obtained FT-IR spectrum is subjected to baseline correction by Automatic Correction.

(8) The maximum value of the absorption peak intensity in the range of 2800 $cm^{-1}$ to 2900 $cm^{-1}$ is calculated (this is referred to as A1 (Ge)).

(9) The average value of the absorption intensities at 2800 $cm^{-1}$ and 2900 $cm^{-1}$ is calculated (this is referred to as A2 (Ge)).

(10) A1 (Ge)−A2 (Ge)=A (Ge). The A (Ge) is defined as the maximum absorption peak intensity in the range of 2800 $cm^{-1}$ to 2900 $cm^{-1}$ corresponding to the stretching vibration of C—H.

(11) The maximum value of the absorption peak intensity in the range of 1500 $cm^{-1}$ to 1800 $cm^{-1}$ is calculated (this is referred to as B1 (Ge)).

(12) The average value of the absorption intensities at 1500 $cm^{-1}$ and 1800 $cm^{-1}$ is calculated (this is referred to as B2 (Ge)).

(13) B1 (Ge)−B2 (Ge)=B (Ge). The B (Ge) is defined as the maximum absorption peak intensity in the range of from 1500 $cm^{-1}$ to 1800 $cm^{-1}$ corresponding to the stretching vibration of C═O.

(14) A (Ge)/B (Ge)=hydrocarbon group index (Ge).

Method for Calculating Hydrocarbon Group Index (DIA)

(1) The ATR crystal of diamond is attached to the device.

(2) Scan type is set to Background and Units to EGY, and the background is measured.

(3) Scan type is set to Sample and Units to A.

(4) A total of 0.01 g of toner is weighed on the ATR crystal.

(5) The sample is pressurized with a pressure arm (Force Gauge is 90).

(6) The sample is measured.

(7) The obtained FT-IR spectrum is subjected to baseline correction by Automatic Correction.

(8) The maximum value of the absorption peak intensity in the range of from 2800 $cm^{-1}$ to 2900 $cm^{-1}$ is calculated (this is referred to as A1 (DIA)).

(9) The average value of the absorption intensities at 2800 $cm^{-1}$ and 2900 $cm^{-1}$ is calculated (this is referred to as A2 (DIA)).

(10) A1 (DIA)−A2 (DIA)=A (DIA). The A (DIA) is defined as the maximum absorption peak intensity in the range of 2800 $cm^{-1}$ to 2900 $cm^{-1}$ corresponding to the stretching vibration of C—H.

(11) The maximum value of the absorption peak intensity in the range of 1500 $cm^{-1}$ to 1800 $cm^{-1}$ is calculated (this is referred to as B1 (DIA)).

(12) The average value of the absorption intensities at 1500 $cm^{-1}$ and 1800 $cm^{-1}$ is calculated (this is referred to as B2 (DIA)).

(13) B1 (DIA)−B2 (DIA)=B (DIA). The B (DIA) is defined as the maximum absorption peak intensity in the range of from 1500 $cm^{-1}$ to 1800 $cm^{-1}$ corresponding to the stretching vibration of C═O.

(14) A (DIA)/B (DIA)=hydrocarbon group index (DIA).

Calculation Method for Measurement of [Hydrocarbon Group Index (Ge)]/[Hydrocarbon Group Index (DIA)]

Using the hydrocarbon group index (Ge) and the hydrocarbon group index (DIA) obtained as described above, the [hydrocarbon group index (Ge)]/[hydrocarbon group index (DIA)] is calculated.

Method for Measuring Charge Decay

The charge decay rate coefficient of the toner particles is measured using an electrostatic dissipation rate measuring device NS-D100 (manufactured by Nano Seeds Corporation). First, a sample pan is filled with about 100 mg of toner particles and scraped to smooth the surface. The sample pan is irradiated with X-rays for 30 sec with an X-ray charge neutralizer to neutralize the charge of the toner particles. The charge-neutralized sample pan is placed on a measuring plate. A metal plate is placed as a reference at the same time for 0 correction of a surface electrometer. The measurement plate on which the sample has been placed is allowed to stand in an environment of 30° C. and 80% RH for 1 h or more before measurement. The measurement conditions are set as follows.

Charge time: 0.1 sec

Measurement time: 1800 sec

Measurement interval: 1 sec

Discharge polarity: −

Electrode: Yes

The initial potential is set to −600 V, and the change in surface potential immediately after charging is measured. The charge decay rate coefficient α is obtained by fitting the obtained results to the following formula.

$$V_t = V_0 \exp(-\alpha t^{1/2})$$

$V_t$: surface potential (V) at time t $V_0$: initial surface potential (V)

t: time (sec) after charging is applied

α: charge decay rate coefficient

Method for Measuring Weight-average Particle Diameter (D4) of Toner Particle

Using a Multi sizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multi sizer 3 Version 3.51 software (Beckman Coulter, Inc.) for setting measurement conditions and analyzing measurement data, measurement is performed with 25000 effective measurement channels, and the measurement data are analyzed to calculate the weight-average particle diameter (D4) of the toner particle (or toner). The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 μA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm. The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counter-clockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner (particle) is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner (particle) dispersed therein is dripped with a pipette into the round-bottomed beaker of (1) set on the sample stand, and adjusted to a measurement concentration of about 5%. Measurement is then performed until the number of measured particles reaches 50000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software.

Method for Measuring 50% Particle Diameter (D50) Based on Volume Distribution of Resin Fine Particles, Wax Fine Particles, and Colorant Fine Particles A dynamic light scattering type particle diameter distribution meter Nanotrack UPA-EX150 (manufactured by Nikkiso Co., Ltd.) is used to measure the 50% particle diameter (D50) based on the volume distribution of fine particles of each type. Specifically, the measurement is performed according to the following procedure. In order to prevent the aggregation of the measurement sample, the dispersion liquid in which the measurement sample is dispersed is put into an aqueous solution including Family Fresh (manufactured by Kao Corporation) and stirred. After stirring, the measurement sample is injected into the above device, and the measurement is performed twice to obtain the average value. As the measurement conditions, the measurement time is 30 sec, the refractive index of the sample particles is 1.49, the dispersion medium is water, and the refractive index of the dispersion medium is 1.33. The volume particle size distribution of the measurement sample is measured, and the particle diameter at which the cumulative volume from the small particle diameter side in the cumulative volume distribution is 50% from the measurement result is defined as the 50% particle diameter (D50) based on the volume distribution of fine particles of each type.

Method for Measuring Softening Temperature (Tm) of Resin

The softening temperature of the resin is measured using a constant load extrusion type capillary rheometer (Shimadzu Corporation, CFT-500D Flowtester flow characteristics evaluation device) in accordance with the attached manual. With this device, the temperature of a measurement sample packed in a cylinder is raised to melt the sample while a fixed load is applied to the measurement sample from above with a piston, the melted measurement sample is extruded through a die at the bottom of the cylinder, and a flow curve can then be obtained showing the relationship between the temperature and the descent of the piston during this process. The "melting temperature by ½ method" as described in the attached manual of the CFT-500D Flowtester flow characteristics evaluation device is given as the softening temperature.

The melting temperature by the ½ method is calculated as follows.

Half of the difference between the descent of the piston upon completion of outflow (outflow end point, given as "Smax") and the descent of piston at the beginning of outflow (minimum point, given as "Smin") is determined and given as X (X=(Smax−Smin)/2). The temperature in the flow curve at which the descent of the piston is the sum of X and Smin is the melting temperature by the ½ method. For the measurement sample, about 1.0 g of resin is compression molded for about 60 seconds at about 10 MPa with a tablet molding compressor (such as NPa Systems Co., Ltd., NT-100H) in a 25° C. environment to obtain a cylindrical sample about 8 mm in diameter.

The specific operations for measurement are performed in accordance with the device manual.

The CFT-500D measurement conditions are as follows.

Test mode: Temperature increase method

Initial temperature: 50° C.

Achieved temperature: 200° C.

Measurement interval: 1.0° C.

Ramp rate: 4.0° C./min

Piston cross-sectional area: 1.000 $cm^2$

Test load (piston load): 10.0 $kgf/cm^2$ (0.9807 MPa)

Pre-heating time: 300 seconds

Die hole diameter: 1.0 mm

Die length: 1.0 mm

EXAMPLES

The basic configuration and features of the present invention have been described above, but the invention of the present application will be specifically described below based on examples. However, the present invention is not limited thereto. Unless otherwise specified, parts and % are based on mass.

Production Example of Crystalline Resin 1

| | |
|---|---|
| Solvent: toluene | 100.0 parts |
| Monomer composition | 100.0 parts |

(The monomer composition was obtained by mixing the following behenyl acrylate, acrylonitrile, and styrene in the proportions shown below.)

(B eh enyl acrylate (first polymerizable monomer): 55.0 parts)

(Acrylonitrile (second polymerizable monomer): 18.0 parts)

(Styrene (third polymerizable monomer): 27.0 parts)

| | |
|---|---|
| Polymerization initiator: t-butyl peroxypivalate (manufactured by NOF Corporation: Perbutyl PV) | 0.5 parts |

The above materials were put under a nitrogen atmosphere into a reaction vessel equipped with a reflux condenser, a stirrer, a thermometer, and a nitrogen introduction tube. A polymerization reaction was carried out for 12 h by heating to 70° C. while stirring the contents of the reaction vessel at 200 rpm to obtain a solution in which the polymer of the monomer composition was dissolved in toluene. Subsequently, after the temperature of the solution was lowered to 25° C., the solution was poured into 1000.0 parts of methanol with stirring to precipitate methanol insolubles. The obtained methanol insolubles were filtered off, further washed with methanol, and vacuum dried at 40° C. for 24 h to obtain a crystalline resin 1. The peak top temperature of the temperature-heat absorption curve of the crystalline resin 1 was 62° C. According to NMR analysis, the crystalline resin 1 included 55.0% by mass of a monomer unit derived from behenyl acrylate, 18.0% by mass of a monomer unit derived from acrylonitrile, and 27.0% by mass of a monomer unit derived from styrene.

Production Example of Crystalline Resins 2 to 12

Crystalline resins 2 to 12 were obtained in the same manner as in the production example of the crystalline resin 1, except that the polymerizable monomers and the number of parts were changed as shown in Table 1. The obtained crystalline resins were analyzed by NMR, and it was confirmed that each monomer unit was contained in the same mass ratio as in the formulation, as in the case of the crystalline resin 1.

TABLE 1

List of crystalline vinyl resin formulations

| No. | First monomer unit | SP1 | parts | Number of cartoon atoms | Second monomer unit | SP2 | parts | Third monomer unit | SP3 | parts | Endothermic peak temperature, ° C. |
|---|---|---|---|---|---|---|---|---|---|---|---|
| 1 | BEA | 18.3 | 55.0 | 22 | AN | 29.4 | 18.0 | St | 20.1 | 27.0 | 62 |
| 2 | BEA | 18.3 | 55.0 | 22 | AA | 28.7 | 18.0 | St | 20.1 | 27.0 | 62 |
| 3 | BEA | 18.3 | 42.0 | 22 | AN | 29.4 | 23.2 | St | 20.1 | 34.8 | 62 |
| 4 | BEA | 18.3 | 68.0 | 22 | AN | 29.4 | 12.8 | St | 20.1 | 19.2 | 62 |
| 5 | BEA | 18.3 | 32.0 | 22 | AN | 29.4 | 27.2 | St | 20.1 | 40.8 | 62 |
| 6 | BEA | 18.3 | 78.0 | 22 | AN | 29.4 | 8.8 | St | 20.1 | 13.2 | 62 |
| 7 | BEA | 18.3 | 28.0 | 22 | AN | 29.4 | 28.8 | St | 20.1 | 43.2 | 62 |
| 8 | BEA | 18.3 | 82.0 | 22 | AN | 29.4 | 7.2 | St | 20.1 | 10.8 | 62 |
| 9 | SA | 18.4 | 82.0 | 18 | AN | 29.4 | 7.2 | St | 20.1 | 10.8 | 58 |
| 10 | MYA | 18.1 | 82.0 | 30 | AN | 29.4 | 7.2 | St | 20.1 | 10.8 | 70 |
| 11 | OA | 18.1 | 82.0 | 28 | AN | 29.4 | 7.2 | St | 20.1 | 10.8 | 68 |
| 12 | BEA | 18.3 | 100.0 | 22 | — | — | — | — | — | — | 62 |

The unit of the SP value is $(J/cm^3)^{0.5}$.

The abbreviations in Table 1 are as follows.

BEA: behenyl acrylate

SA: stearyl acrylate

MYA: myrisyl acrylate

OA: octacosyl acrylate

AN: acrylonitrile

AA: acrylic acid

St: styrene

Production Example of Crystalline Resin 13

1,12-Dodecanediol: 46.5 parts

Dodecanedioic acid: 53.3 parts

Tin 2-ethylhexanoate: 0.5 parts

The above materials were weighed in a reaction vessel equipped with a cooling tube, a stirrer, a nitrogen introduction tube, and a thermocouple. After replacing the inside of the flask with nitrogen gas, the temperature was gradually raised while stirring, and the reaction was carried out for 3 h while stirring at a temperature of 140° C. Next, the pressure in the reaction vessel was lowered to 8.3 kPa, and the reaction was carried out for 4 h while maintaining the temperature at 200° C. Then, the inside of the reaction vessel was depressurized to 5 kPa or less and the reaction was carried out at 200° C. for 3 h to obtain a crystalline resin 13.

Production Examples of Crystalline Resins 14 and 15

Crystalline resins 14 and 15 were obtained in the same manner as in the production example of the crystalline resin 13, except that the alcohol component and the carboxylic acid component were changed to the monomers shown in Table 2.

TABLE 2

| List of crystalline polyester resin formulations | | | | | | | |
|---|---|---|---|---|---|---|---|
| No. | Alcohol component | mol % | SP value | Carboxylic acid component | mol % | SP value | Endothermic peak temperature, ° C. |
| 13 | DDO | 50.0 | 21.7 | DDA | 50.0 | 21.9 | 72 |
| 14 | HO | 50.0 | 24.5 | DDA | 50.0 | 21.9 | 75 |
| 15 | EG | 50.0 | 30.3 | AA | 50.0 | 24.9 | 78 |

The unit of the SP value is $(J/cm^3)^{0.5}$.

The abbreviations in Table 2 are as follows.

DDO: dodecanediol

DDA: dodecanedioic acid

HO: hexanediol

EG: ethylene glycol

AA: adipic acid

Production Example of Amorphous Resin 1

A total of 50.0 parts of xylene was charged in an autoclave, the autoclave was purged with nitrogen, and the temperature was then raised to 185° C. in a sealed state with stirring. Here, 75.0 parts of styrene, 25.0 parts of n-butyl acrylate, and a mixed solution of 1.0 part of di-tert-butyl peroxide and 20.0 parts of xylene was continuously dropwise added, and polymerization was performed for 3 h while controlling the temperature inside the autoclave to 185° C. The same temperature was further held for 1 h to complete the polymerization, the solvent was removed, and an amorphous resin 1 was obtained. The SP value of the amorphous resin 1 was 20.1 $(J/cm^3)^{0.5}$, and the softening point (Tm) was 100° C.

Production Example of Amorphous Resin 2

The following materials were put under a nitrogen atmosphere into a reaction vessel equipped with a reflux condenser, a stirrer, a thermometer, and a nitrogen introduction tube.

Polyoxypropylene (2.2)-2,2-bis (4-hydroxyphenyl) propane: 73.4 parts (0.19 mol)

Terephthalic acid: 11.6 parts (0.07 mol)

Adipic acid: 6.8 parts (0.05 mol)

Titanium tetrabutoxide: 2.0 parts

Next, after purging the flask with nitrogen gas, the temperature was gradually raised while stirring, stirring was performed at a temperature of 200° C., and the reaction was carried out for 2 h while distilling off the generated water. Further, the pressure in the reaction vessel was lowered to 8.3 kPa and maintained for 1 h, followed by cooling to 180° C. and returning to atmospheric pressure (first reaction step).

Trimellitic acid anhydride: 8.2 parts (0.04 mol)

tert-Butylcatechol (polymerization inhibitor): 0.1 parts

After that, the above materials were added, the pressure in the reaction vessel was lowered to 8.3 kPa, the reaction was carried out for 4 h while maintaining the temperature at 150° C., and the reaction was stopped by lowering the temperature (second reaction step), thereby obtaining an amorphous resin 2 which is a second resin. The SP value of the amorphous resin 2 was 23.3 $(J/cm^3)^{0.5}$, and the softening point (Tm) was 105° C.

Production Example of Toner 1

Amorphous resin 1: 50.0 parts

Wax 1: 5.0 parts (Fischer-Tropsch wax; peak temperature of maximum endothermic peak 90° C.)

Colorant 1: 9.0 parts (Cyan pigment Dainichiseika Color & Chemicals Mfg. Co., Ltd.: Pigment Blue 15:3)

The above materials were mixed using Henshell mixer (FM-75 type, manufactured by Nippon Coke Industries Co., Ltd.) at a rotation speed of 20 $s^{-1}$ and a rotation time of 5 min and then kneaded at a discharge temperature of 120° C. in a twin-screw kneader (PCM-30, manufactured by Ikegai Co., Ltd.) set at a temperature of 110° C. The obtained kneaded product was cooled and coarsely pulverized to 1 mm or less with a hammer mill to obtain a coarsely pulverized product. The obtained coarsely pulverized product was finely pulverized with a mechanical pulverizer (T-250, manufactured by Freund Turbo Co., Ltd.). Further, classification was performed using Faculty F-300 (manufactured by Hosokawa Micron Corporation) to obtain toner particles 1. The operating conditions were a classification rotor rotation speed of 130 $s^{-1}$ and a distributed rotor rotation speed of 120 $s^{-1}$.

The obtained toner particles were heat-treated by the surface treatment apparatus shown in the FIGURE to obtain heat-treated toner particles. The operating conditions were as follows: feed amount=3 kg/h, hot air temperature=130° C., hot air flow rate=6 $m^3$/min, cold air temperature=−5° C., cold air flow rate=4 $m^3$/min, blower air volume=20 $m^3$/min, and injection air flow rate=1 $m^3$/min.

A total of 0.5 parts of hydrophobic silica fine particles that were surface-treated with 4% by mass of hexamethyldisilazane and had a BET specific surface area of 25 $m^2$/g and 0.5 part of hydrophobic silica fine particles that were surface-treated with 10% by mass of polydimethylsiloxane and had a BET specific surface area of 100 $m^2$/g were added to the obtained heat-treated toner particles 1 (100 parts), and the components were mixed at a rotation speed of 30 $s^{-1}$ for a rotation time of 10 min with a Henschel mixer (FM-75 type, manufactured by Nippon Coke Industries Co., Ltd.) to obtain a toner 1. The weight average particle diameter (D4) of the toner 1 was about 6.5 μm.

Production Example of Toner 2

A toner 2 was obtained in the same manner as in the production example of toner 1, except that the materials were changed to those shown in Table 3.

Production Examples of Toners 3 to 5

Toners 3 to 5 were obtained in the same manner as in the production example of toner 1, except that the hot air temperature at the time of thermal spheroidizing treatment in the production example of toner 1 was changed as shown in Table 3.

Production Example of Crystalline Resin 1 Fine Particle Dispersion Liquid

| | |
|---|---|
| Toluene (manufactured by Wako Pure Chemical Industries, Ltd.) | 300 parts |
| Crystalline resin 1 | 100 parts |

The above materials were weighed and mixed and dissolved at 100° C. Separately, 5.0 parts of sodium dodecylbenzenesulfonate and 10.0 parts of sodium laurate were added to 700 parts of ion-exchanged water and dissolved by heating at 100° C. Next, the toluene solution and the aqueous solution were mixed and stirred at 7000 rpm using an ultrafast stirrer T. K. ROBOMIX, manufactured by PRIMIX Corporation). Further, emulsification was performed at a pressure of 200 MPa using a high-pressure impact disperser NANOMIZER (manufactured by Yoshida Kikai Co., Ltd.). Then, toluene was removed using an evaporator, and the concentration was adjusted with ion-exchanged water to obtain an aqueous dispersion liquid (crystalline resin 1 fine particle dispersion liquid) having a concentration of the crystalline resin 1 fine particles of 20% by mass. The 50% particle diameter (D50) of the crystalline resin 1 based on the volume distribution was measured using a dynamic light scattering type particle size distribution meter NANO-TRACK UPA-EX150 (manufactured by Nikkiso Co., Ltd.) and found to be 0.40 μm.

Production Examples of Crystalline Resins 2 to 15 Fine Particle Dispersion Liquid Crystalline resins 2 to 15 fine particle dispersion liquid were obtained in the same manner as in the production examples of crystalline resin 1 fine particle dispersion liquid, except that the crystalline material used in the production example of crystalline resin 1 fine particle dispersion liquid was changed respectively.

Production Example of Amorphous Resin 1 Fine Particle Dispersion Liquid

| | |
|---|---|
| Tetrahydrofuran (manufactured by Wako Pure Chemical Industries, Ltd.) | 300 parts |
| Amorphous resin 1 | 100 parts |
| Anionic surfactant NEOGEN RK (manufactured by Dai-ichi Kogyo Seiyaku Co., Ltd.) | 0.5 parts |

The above materials were weighed and mixed and dissolved. Next, 20.0 parts of 1 mol/L ammonia water was added, and stirring was performed at 4000 rpm using the ultrafast stirrer T. K. ROBOMIX, manufactured by PRIMIX Corporation). Further, 700 parts of ion-exchanged water was added at a rate of 8 g/min to precipitate amorphous resin 1 fine particles. Then, tetrahydrofuran was removed using an evaporator, and the concentration was adjusted with ion-exchanged water to obtain an aqueous dispersion liquid (amorphous resin 1 fine particle dispersion liquid) having a concentration of the amorphous resin 1 fine particles of 20% by mass. The 50% particle diameter (D50) based on the volume distribution of the amorphous resin 1 fine particles was 0.14

Production Example of Amorphous Resin 2 Fine Particle Dispersion Liquid

An amorphous resin 2 fine particle dispersion liquid was obtained in the same manner as in the production example of amorphous resin 1 fine particle dispersion liquid, except that the amorphous material used in the production example of amorphous resin 1 fine particle dispersion liquid was changed.

Production Example of Wax Fine Particle Dispersion Liquid

| | |
|---|---|
| Wax 1 (Fischer-Tropsch wax; peak temperature of maximum endothermic peak 90° C,) | 100.0 parts |
| Anionic surfactant NEOGEN RK (manufactured by Dai-ichi Kogyo Seiyaku Co., Ltd.) | 5 parts |
| Ion-exchanged water | 395 parts |

The above materials were weighed, placed in a mixing container equipped with a stirrer, heated to 90° C., circulated to CLEAREMIX W-MOTION (manufactured by M-Technique Co., Ltd.), and subjected to dispersion treatment for 60 min. The conditions for the dispersion treatment were as follows.

Rotor outer diameter: 3 cm

Clearance: 0.3 mm

Rotor rotation speed: 19000 r/min

Screen rotation speed: 19000 r/min

After the dispersion treatment, cooling to 40° C. was performed under the cooling conditions of a rotor rotation speed of 1000 r/min, a screen rotation speed of 0 r/min, and a cooling speed of 10° C./min to obtain an aqueous dispersion liquid (wax fine particle dispersion liquid) having a concentration of wax fine particles of 20% by mass. The 50% particle diameter (D50) of the wax fine particles based on the volume distribution was measured using a dynamic light scattering type particle side distribution meter NANO-TRACK UPA-EX150 (manufactured by Nikkiso Co., Ltd.) and found to be 0.15 μm.

Production Example of Colorant Fine Particle Dispersion Liquid

| | |
|---|---|
| Colorant 1 (Cyan pigment: Pigment Blue 15:3, manufactured by Dainichiseika Color & Chem MFG Co., Ltd.) | 50.0 parts |
| Anionic surfactant NEOGEN RK (manufactured by Dai-ichi Kogyo Seiyaku Co., Ltd.) | 7.5 parts |
| Ion-exchanged water | 442.5 parts |

The above materials were weighed, mixed, dissolved, and dispersed for about 1 h using a high-pressure impact disperser NANOMIZER (manufactured by Yoshida Kikai Co., Ltd.) to obtain an aqueous dispersion liquid (colorant fine particle dispersion liquid) in which the colorant was dispersed and which had a concentration of colorant fine particles of 10% by mass. The 50% particle diameter (D50) based on the volume distribution of the colorant fine particles was measured using a dynamic light scattering type particle side distribution meter NANOTRACK UPA-EX150 (manufactured by Nikkiso Co., Ltd.) and found to be 0.20 μm.

Toner particles were produced by the following method using each dispersion liquid produced by the above method.

Production Example of Toner 6

| | |
|---|---|
| Crystalline resin 1 fine particle dispersion liquid | 50.0 parts |
| Amorphous resin 1 fine particle dispersion liquid | 50.0 parts |
| Wax fine particle dispersion liquid | 5.0 parts |
| Colorant fine particle dispersion liquid | 9.0 parts |
| Ion-exchanged water | 20.0 parts |
| Crystalline resin 1 fine particle dispersion liquid for post-treatment | 3.0 parts |

The materials other than the above-mentioned crystalline resin 1 fine particle dispersion liquid for post-treatment were put into a round stainless steel flask and mixed. Subsequently, a homogenizer ULTRA-TURRAX T50 (manufactured by IKA Works Inc.) was used to disperse at 5000 r/min for 10 min. After adding a 1.0% aqueous nitric acid solution and adjusting the pH to 3.0, a stirring blade was used in a water bath for heating and heating to 58° C. was performed while adjusting, as appropriate, the number of revolutions at which the mixed solution was stirred. The formed aggregated particles were confirmed, as appropriate, using Coulter Multisizer III and held until the weight average particle diameter (D4) became about 6.4 μm. Then, the crystalline resin 1 fine particle dispersion for post-treatment was added, followed by holding for another 30 min, and then the pH was adjusted to 9.0 using a 5% aqueous sodium hydroxide solution.

After that, the mixture was heated to 75° C. while continuing stirring at 500 r/min. Then, the aggregated particles were fused by holding at 75° C. for 1 h. Then, the crystallization of the resin was promoted by cooling to 50° C. and holding for 3 h. Then, toner particles 6 were obtained by cooling to 25° C., filtering and solid-liquid separating, and then thoroughly washing with ion-exchanged water and drying. The weight average particle diameter (D4) of the toner particles 6 was about 6.5 Hydrophobic silica fine particles were externally added to the obtained toner particles 6 in the same manner as in the production example of toner 1 to obtain a toner 6.

Production Examples of Toners 7 to 36

Toners 7 to 36 were obtained in the same manner as in the production example of toner 6, except that the materials and the rotation speed and temperature in the fusion step were changed to those shown in Table 3.

Production Example of Toner 37

| | |
|---|---|
| Crystalline resin 12 fine particle dispersion liquid | 40.0 parts |
| Amorphous resin 1 fine particle dispersion liquid | 60.0 parts |
| Wax fine particle dispersion liquid | 5.0 parts |
| Colorant fine particle dispersion liquid | 9.0 parts |
| Ion-exchanged water | 20.0 parts |
| Amorphous resin 1 fine particle dispersion liquid for post-treatment | 5.0 parts |

The materials other than the above-mentioned amorphous resin 1 fine particle dispersion liquid for post-treatment were put into a round stainless steel flask and mixed. Subsequently, a homogenizer Ultra-Turrax T50 (manufactured by IKA) was used for dispersing at 5000 r/min for 10 min. After adding a 1.0% aqueous nitric acid solution and adjusting the pH to 3.0, heating to 58° C. was performed while adjusting, as appropriate, the rotation speed for stirring the mixed liquid by using a stirring blade in a water bath for heating. The formed aggregated particles were confirmed, as appropriate, using Coulter Multisizer III and held until the weight average particle diameter (D4) became about 6.3 μm. Then, amorphous resin 1 fine particle dispersion liquid for post-treatment were added, followed by holding for another 30 min and then using a 5% aqueous sodium hydroxide solution to adjust the pH to 9.0.

After that, heating to 70° C. was performed while continuing stirring at 450 r/min. Then, the aggregated particles were fused by holding at 70° C. for 1 h. Then, the crystallization of the resin was promoted by cooling to 50° C. and holding for 3 h. Then, toner particles 37 were obtained by cooling to 25° C., filtering and solid-liquid separating, and then thoroughly washing with ion-exchanged water and drying. Hydrophobic silica fine particles were externally added to the obtained toner particles 37 in the same manner as in the production example of toner 1 to obtain a toner 37.

The physical characteristics of the obtained toners 1 to 37 are summarized in Table 4.

TABLE 3

| Toner formulation | | | | | | | | | | | | | |
|---|---|---|---|---|---|---|---|---|---|---|---|---|---|
| | | | | | | | | | | | | Fusion step | |
| Toner | Production | Crystalline resin | | Amorphous resin | | Wax | | Resin for post-treatment | | | | Rotation speed | Temp. |
| No. | method | No. | Parts | No. | Parts | No. | Parts | Type | Parts | TST | | r/min | ° C. |
| 1 | P | 1 | 50.0 | 1 | 50.0 | 1 | 5.0 | None | None | 130° C. | | None | None |
| 2 | P | 2 | 50.0 | 1 | 50.0 | 1 | 5.0 | None | None | 130° C. | | None | None |
| 3 | P | 1 | 50.0 | 1 | 50.0 | 1 | 5.0 | None | None | 110° C. | | None | None |
| 4 | P | 1 | 50.0 | 1 | 50.0 | 1 | 5.0 | None | None | 180° C. | | None | None |
| 5 | P | 1 | 50.0 | 1 | 50.0 | 1 | 5.0 | None | None | 100° C. | | None | None |
| 6 | EA | 1 | 50.0 | 1 | 50.0 | 1 | 5.0 | Crystalline resin 1 | 3.0 | None | | 500 | 75 |
| 7 | EA | 1 | 50.0 | 2 | 50.0 | 1 | 5.0 | Crystalline resin 1 | 3.0 | None | | 500 | 75 |
| 8 | EA | 3 | 50.0 | 1 | 50.0 | 1 | 5.0 | Crystalline resin 3 | 3.0 | None | | 500 | 75 |

TABLE 3-continued

| Toner formulation | | | | | | | | | | | | |
|---|---|---|---|---|---|---|---|---|---|---|---|---|
| | | | | | | | | | | | Fusion step | |
| Toner | Production | Crystalline resin | | Amorphous resin | | Wax | | Resin for post-treatment | | | Rotation speed | Temp. |
| No. | method | No. | Parts | No. | Parts | No. | Parts | Type | Parts | TST | r/min | ° C. |
| 9 | EA | 4 | 50.0 | 1 | 50.0 | 1 | 5.0 | Crystalline resin 4 | 3.0 | None | 500 | 75 |
| 10 | EA | 5 | 50.0 | 1 | 50.0 | 1 | 5.0 | Crystalline resin 5 | 3.0 | None | 500 | 75 |
| 11 | EA | 6 | 50.0 | 1 | 50.0 | 1 | 5.0 | Crystalline resin 6 | 3.0 | None | 500 | 75 |
| 12 | EA | 7 | 50.0 | 1 | 50.0 | 1 | 5.0 | Crystalline resin 7 | 3.0 | None | 500 | 75 |
| 13 | EA | 8 | 50.0 | 1 | 50.0 | 1 | 5.0 | Crystalline resin 8 | 3.0 | None | 500 | 75 |
| 14 | EA | 9 | 50.0 | 1 | 50.0 | 1 | 5.0 | Crystalline resin 9 | 3.0 | None | 500 | 75 |
| 15 | EA | 10 | 50.0 | 1 | 50.0 | 1 | 5.0 | Crystalline resin 10 | 3.0 | None | 500 | 75 |
| 16 | EA | 11 | 50.0 | 1 | 50.0 | 1 | 5.0 | Crystalline resin 11 | 3.0 | None | 500 | 75 |
| 17 | EA | 13 | 50.0 | 1 | 50.0 | 1 | 5.0 | Crystalline resin 13 | 3.0 | None | 500 | 75 |
| 18 | EA | 14 | 50.0 | 1 | 50.0 | 1 | 5.0 | Crystalline resin 14 | 3.0 | None | 500 | 75 |
| 19 | EA | 15 | 50.0 | 1 | 50.0 | 1 | 5.0 | Crystalline resin 15 | 3.0 | None | 500 | 75 |
| 20 | EA | 15 | 50.0 | 1 | 50.0 | 1 | 5.0 | Crystalline resin 15 | 3.0 | None | 700 | 80 |
| 21 | EA | 15 | 50.0 | 1 | 50.0 | 1 | 5.0 | Crystalline resin 15 | 3.0 | None | 500 | 70 |
| 22 | EA | 15 | 50.0 | 1 | 50.0 | 1 | 5.0 | Crystalline resin 15 | 3.0 | None | 800 | 80 |
| 23 | EA | 15 | 50.0 | 1 | 50.0 | 1 | 5.0 | Crystalline resin 15 | 3.0 | None | 400 | 70 |
| 24 | EA | 15 | 50.0 | 1 | 50.0 | 1 | 5.0 | Crystalline resin 15 | 3.0 | None | 1000 | 80 |
| 25 | EA | 15 | 50.0 | 1 | 50.0 | 1 | 5.0 | Crystalline resin 15 | 3.0 | None | 300 | 70 |
| 26 | EA | 15 | 50.0 | 1 | 50.0 | 1 | 5.0 | Crystalline resin 15 | 1.5 | None | 300 | 70 |
| 27 | EA | 15 | 42.0 | 1 | 58.0 | 1 | 5.0 | Crystalline resin 15 | 1.5 | None | 300 | 70 |
| 28 | EA | 15 | 58.0 | 1 | 42.0 | 1 | 5.0 | Crystalline resin 15 | 1.5 | None | 300 | 70 |
| 29 | EA | 15 | 38.0 | 1 | 62.0 | 1 | 5.0 | Crystalline resin 15 | 1.5 | None | 300 | 70 |
| 30 | EA | 15 | 67.0 | 1 | 33.0 | 1 | 5.0 | Crystalline resin 15 | 1.5 | None | 300 | 70 |
| 31 | EA | 15 | 67.0 | 1 | 33.0 | 1 | 5.0 | None | None | None | 300 | 70 |
| 32 | EA | 15 | 80.0 | 1 | 20.0 | 1 | 5.0 | None | None | None | 300 | 70 |
| 33 | EA | 15 | 15.0 | 1 | 85.0 | 1 | 5.0 | None | None | None | 300 | 70 |
| 34 | EA | 12 | 100.0 | — | — | 1 | 5.0 | None | None | None | 500 | 75 |
| 35 | EA | 12 | 40.0 | 1 | 60.0 | 1 | 5.0 | None | None | None | 450 | 70 |
| 36 | EA | 15 | 80.0 | 1 | 20.0 | 1 | 5.0 | Crystalline resin 15 | 1.5 | None | 300 | 70 |
| 37 | EA | 12 | 40.0 | 1 | 60.0 | 1 | 5.0 | Amorphous resin 1 | 3.0 | None | 450 | 70 |

In the Table 3, "P" indicates "Pulverization method", "EA" indicates "Emulsion and aggregation method", "TST" indicates "Thermal spheroidizing treatment temperature", and "Temp." indicates "Temperature".

TABLE 4

| Physical properties of toner | | | | | | | |
|---|---|---|---|---|---|---|---|
| | Cross-sectional structure | | | | | | |
| Toner No. | Matrix | Domains | Area ratio % | diameter (nm) | IR index (Ge)/(DIA) | CD | D4 (μm) |
| 1 | Crystalline resin | Amorphous resin | 50 | 200 | 1.30 | 40 | 6.5 |
| 2 | Crystalline resin | Amorphous resin | 50 | 200 | 1.30 | 40 | 6.5 |
| 3 | Crystalline resin | Amorphous resin | 50 | 200 | 1.22 | 35 | 6.5 |
| 4 | Crystalline resin | Amorphous resin | 50 | 200 | 1.35 | 45 | 6.5 |
| 5 | Crystalline resin | Amorphous resin | 50 | 200 | 1.18 | 30 | 6.5 |
| 6 | Crystalline resin | Amorphous resin | 50 | 200 | 1.18 | 34 | 6.5 |
| 7 | Crystalline resin | Amorphous resin | 50 | 200 | 1.18 | 41 | 6.5 |
| 8 | Crystalline resin | Amorphous resin | 50 | 200 | 1.18 | 28 | 6.5 |
| 9 | Crystalline resin | Amorphous resin | 50 | 200 | 1.18 | 32 | 6.5 |
| 10 | Crystalline resin | Amorphous resin | 50 | 200 | 1.18 | 26 | 6.5 |
| 11 | Crystalline resin | Amorphous resin | 50 | 200 | 1.18 | 41 | 6.5 |
| 12 | Crystalline resin | Amorphous resin | 50 | 200 | 1.18 | 22 | 6.5 |
| 13 | Crystalline resin | Amorphous resin | 50 | 200 | 1.18 | 46 | 6.5 |
| 14 | Crystalline resin | Amorphous resin | 50 | 200 | 1.18 | 34 | 6.5 |
| 15 | Crystalline resin | Amorphous resin | 50 | 200 | 1.18 | 40 | 6.5 |
| 16 | Crystalline resin | Amorphous resin | 50 | 200 | 1.18 | 38 | 6.5 |
| 17 | Crystalline resin | Amorphous resin | 50 | 200 | 1.18 | 50 | 6.5 |
| 18 | Crystalline resin | Amorphous resin | 50 | 200 | 1.18 | 65 | 6.5 |
| 19 | Crystalline resin | Amorphous resin | 50 | 200 | 1.18 | 80 | 6.5 |
| 20 | Crystalline resin | Amorphous resin | 50 | 200 | 1.18 | 80 | 6.5 |
| 21 | Crystalline resin | Amorphous resin | 50 | 200 | 1.18 | 80 | 6.5 |
| 22 | Crystalline resin | Amorphous resin | 50 | 30 | 1.18 | 80 | 6.5 |
| 23 | Crystalline resin | Amorphous resin | 50 | 480 | 1.18 | 80 | 6.5 |
| 24 | Crystalline resin | Amorphous resin | 50 | 15 | 1.18 | 80 | 6.5 |
| 25 | Crystalline resin | Amorphous resin | 50 | 650 | 1.18 | 80 | 6.5 |
| 26 | Crystalline resin | Amorphous resin | 50 | 650 | 1.12 | 75 | 6.5 |

TABLE 4-continued

| Physical properties of toner | | | | | | | |
|---|---|---|---|---|---|---|---|
| | Cross-sectional structure | | | | | | |
| Toner No. | Matrix | Domains | Area ratio % | diameter (nm) | IR index (Ge)/(DIA) | CD | D4 (μm) |
| 27 | Crystalline resin | Amorphous resin | 42 | 650 | 1.12 | 74 | 6.5 |
| 28 | Crystalline resin | Amorphous resin | 58 | 650 | 1.12 | 85 | 6.5 |
| 29 | Crystalline resin | Amorphous resin | 38 | 650 | 1.12 | 73 | 6.5 |
| 30 | Crystalline resin | Amorphous resin | 67 | 650 | 1.12 | 100 | 6.5 |
| 31 | Crystalline resin | Amorphous resin | 67 | 650 | 1.00 | 90 | 6.5 |
| 32 | Crystalline resin | Amorphous resin | 80 | 650 | 1.00 | 120 | 6.5 |
| 33 | Amorphous resin | Crystalline resin | 15 | 650 | 1.00 | 8 | 6.5 |
| 34 | Domain-matrix structure is not confirmed | | | | 1.00 | 50 | 6.5 |
| 35 | Crystalline resin | Amorphous resin | 40 | 300 | 1.00 | 25 | 6.5 |
| 36 | Crystalline resin | Amorphous resin | 80 | 650 | 1.12 | 140 | 6.5 |
| 37 | Crystalline resin | Amorphous resin | 40 | 300 | 0.80 | 40 | 6.5 |

In the table 4, "Area ratio" indicates the area ratio (area %) occupied by the matrix in the total area of the matrix and the domains, "diameter" is the number-average circle-equivalent diameter of the domains, "(Ge)/(DIA)" indicates "[Hydrocarbon group index (Ge)]/[hydrocarbon group index (DIA)]", and "CD" indicates "Charge decay rate coefficient".

Manufacturing Example of Magnetic Carrier 1

Magnetite 1 with number-average particle diameter of 0.30 μm (magnetization strength 65 $Am^2/kg$ in 1000/4π (kA/m) magnetic field)

Magnetite 2 with number-average particle diameter of 0.50 pin (magnetization strength 65 $Am^2/kg$ in 1000/4π (kA/m) magnetic field)

4.0 parts of a silane compound (3-(2-aminoethylamino-propyl)trimethoxysilane) were added to 100 parts each of the above materials, and mixed and stirred at high speed at 100° C. or more in a vessel to treat the respective fine particles.

Phenol: 10 mass %

Formaldehyde solution: 6 mass %

(formaldehyde 40 mass %, methanol 10 mass %, water 50 mass %)

Magnetite 1 treated with silane compound: 58 mass %

Magnetite 2 treated with silane compound: 26 mass %

100 parts of these materials, 5 parts of 28 mass % aqueous ammonia solution and 20 parts of water were placed in a flask, and stirred and mixed as the temperature was raised to 85° C. for 30 minutes, and maintained for 3 hours to perform a polymerization reaction, and the resulting phenol resin was hardened.

The hardened phenol resin was then cooled to 30° C., water was added, the supernatant was removed, and the precipitate was water washed and air dried. This was then dried at 60° C. under reduced pressure (5 mmHg or less) to obtain a magnetic dispersion-type spherical magnetic carrier 1. The volume-based 50% particle diameter (D50) of magnetic carrier 1 was 34.2 μm.

Production Examples of Two-Component Developers 1 to 37

Two-component developers 1 to 37 were obtained by mixing at 0.5 $s^{-1}$ for 5 min with a V-type mixer (V-10 type: Tokuju Corporation) so that the toner concentration was 9% by mass in the mixtures of each of the toners 1 to 37 and the magnetic carrier 1 (50% particle diameter 34.2 μm on the volume standard).

Toner Evaluation

As an image forming apparatus, a modified Canon full-color copier imagePRESS C800 was used, and the two-component developer 1 was put into the developing device of the cyan station. The modification involved changes made so as to enable free setting of the fixing temperature, the process speed, the DC voltage $V_{DC}$ of the developer bearing member, the charging voltage $V_D$ of the electrostatic latent image bearing member, and the laser power. In the image output evaluation, the below-described evaluation was performed by outputting an FFh image (solid image) having a desired image ratio and adjusting the $V_{DC}$, $V_D$, and laser power to obtain the desired toner laid-on level on the FFh image on paper. The FFh is a value in which 256 gradations are displayed in hexadecimal, 00h is the first gradation (white background portion) of 256 gradations, and FFh is the 256th gradation (solid portion) of 256 gradations. The evaluation is performed based on the following evaluation methods, and the results are shown in Table 5.

Low-Temperature Fixability

Paper: Mondi color copy paper (300 $g/m^2$)

(Sold by Mondi Group)

Toner laid-on level on paper: 1.20 $mg/cm^{-1}$ (FFh image)

(Adjusted by the DC voltage $V_{DC}$ of the developer bearing member, the charging voltage $V_D$ of the electrostatic latent image bearing member, and the laser power)

Evaluation image: an image of 2 cm×5 cm is placed in the center of the A4 paper

Test environment: low-temperature and low-humidity environment: temperature 15° C./humidity 10% RH (hereinafter "L/L")

Fixing temperature: 170° C.

Process speed: 348 mm/sec

The evaluation image was output and the low-temperature fixability was evaluated. The value of the image density reduction rate was used as an evaluation index for low-temperature fixability. The image density reduction rate was determined by first measuring the image density at the center by using an X-Rite color reflection densitometer (500 series: manufactured by X-Rite, Inc.). Next, a load of 4.9 kPa (50 $g/cm^2$) was applied to the portion where the image density was measured, the fixed image was rubbed (5 reciprocations) with Sylbon paper, and the image density was measured again. Then, the image density reduction rate before and after rubbing was calculated using the following formula. The obtained image density reduction rate was evaluated according to the following evaluation criteria. The evaluation of A to E was determined to be good.

Image density reduction rate=[(Image density before rubbing)−(Image density after rubbing)]/(Image density before rubbing)×100

Evaluation Criteria

A: image density reduction rate is less than 0.5%

B: image density reduction rate of 0.5% or more and less than 1.0%

C: image density reduction rate of 1.0% or more and less than 2.0%

D: image density reduction rate of 2.0% or more and less than 3.0%

E: image density reduction rate of 3.0% or more and less than 4.0%

F: image density reduction rate 4.0% or more and less than 5.0%

G: image density reduction rate of 5.0% or more

Emboss Transferability

Paper: Rezac 66 (302 $g/m^2$)

(Sold by Tokushu Tokai Paper Co., Ltd., embossed paper)

Toner laid-on level on paper: 0.90 $mg/cm^{-1}$ (FFh image) (The toner laid-on level on paper was checked in advance by using Mondi color copy paper (250 $g/m^2$) (sold by Mondi Group) and adjusted by the DC voltage $V_{DC}$ of the developer bearing member, the charging voltage $V_D$ of the electrostatic latent image bearing member, and the laser power)

Evaluation image: an image is placed on the entire surface of A4 of Rezac 66

Fixing test environment: normal temperature and normal humidity environment: (temperature 23° C./humidity 50% RH (hereinafter "N/N")

Fixing temperature: 180° C.

Process speed: 173 mm/sec

The evaluation image was output and the emboss transferability was evaluated. The standard deviation of brightness was used as an evaluation index for emboss transferability. Using a scanner (trade name: CanoScan 9000F, manufactured by Canon Inc.), the image was read with a reading resolution of 1200 dpi and image correction processing OFF, and trimming was performed in the range of 2550×2550 pixels (approximately 10.8×10.8 cm). Subsequently, a brightness value histogram of the above-mentioned image data (ordinate: frequency (number of pixels), abscissa: brightness, brightness value is represented in the range of 0 to 255) was obtained. Further, based on the obtained brightness value histogram, the brightness standard deviation in the image data was obtained. The evaluation of A to L was determined to be good. The image processing software "ImageJ" was used to calculate the brightness standard deviation.

Evaluation Criterion: Brightness Standard Deviation

A: less than 2.0

B: 2.0 or more and less than 5.0

C: 5.0 or more and less than 8.0

D: 8.0 or more and less than 11.0

E: 11.0 or more and less than 14.0

F: 14.0 or more and less than 17.0

G: 17.0 or more and less than 20.0

H: 20.0 or more and less than 23.0

I: 23.0 or more and less than 26.0

J: 26.0 or more and less than 29.0

K: 29.0 or more and less than 32.0

L: 32.0 or more and less than 35.0

M: 35.0 or more and less than 38.0

N: 38.0 or more and less than 41.0

O: 41.0 or more

The two-component developers 2 to 37 were evaluated in the same manner as the two-component developer 1. The results are shown in Table 5.

TABLE 5

Evaluation results

| Example | Two-component developer | | | Evaluation of low-temperature fixability | | Evaluation of emboss transferability | |
|---|---|---|---|---|---|---|---|
| | | Toner | Magnetic carrier | | | | Standard |
| No. | No. | No. | No. | Rank | % | Rank | deviation |
| 1 | 1 | 1 | 1 | A | 0.3 | A | 1.0 |
| 2 | 2 | 2 | 1 | A | 0.3 | A | 1.0 |
| 3 | 3 | 3 | 1 | A | 0.4 | A | 1.8 |
| 4 | 4 | 4 | 1 | A | 0.1 | A | 0.5 |
| 5 | 5 | 5 | 1 | B | 0.7 | B | 4.0 |
| 6 | 6 | 6 | 1 | C | 1.2 | C | 7.0 |
| 7 | 7 | 7 | 1 | C | 1.2 | D | 8.5 |
| 8 | 8 | 8 | 1 | C | 1.2 | C | 7.0 |
| 9 | 9 | 9 | 1 | C | 1.2 | C | 7.0 |
| 10 | 10 | 10 | 1 | C | 1.2 | D | 9.5 |
| 11 | 11 | 11 | 1 | C | 1.2 | D | 9.5 |
| 12 | 12 | 12 | 1 | C | 1.2 | E | 12.0 |
| 13 | 13 | 13 | 1 | C | 1.2 | E | 12.0 |
| 14 | 14 | 14 | 1 | C | 1.2 | E | 12.0 |
| 15 | 15 | 15 | 1 | C | 1.8 | E | 12.0 |
| 16 | 16 | 16 | 1 | C | 1.8 | E | 12.0 |
| 17 | 17 | 17 | 1 | D | 2.2 | F | 16.5 |
| 18 | 18 | 18 | 1 | D | 2.2 | G | 18.0 |
| 19 | 19 | 19 | 1 | D | 2.2 | H | 21.0 |
| 20 | 20 | 20 | 1 | D | 2.2 | H | 21.0 |
| 21 | 21 | 21 | 1 | D | 2.2 | H | 21.0 |
| 22 | 22 | 22 | 1 | D | 2.5 | I | 24.0 |

TABLE 5-continued

| Evaluation results | | | | | | | |
|---|---|---|---|---|---|---|---|
| | Two-component developer | | | | | Evaluation of emboss transferability | |
| | | | Magnetic carrier | Evaluation of low-temperature fixability | | | |
| Example No. | No. | Toner No. | No. | Rank | % | Rank | Standard deviation |
| 23 | 23 | 23 | 1 | D | 2.5 | I | 24.0 |
| 24 | 24 | 24 | 1 | D | 2.5 | J | 28.0 |
| 25 | 25 | 25 | 1 | D | 2.5 | J | 28.0 |
| 26 | 26 | 26 | 1 | E | 3.4 | K | 30.0 |
| 27 | 27 | 27 | 1 | E | 3.4 | K | 30.0 |
| 28 | 28 | 28 | 1 | E | 3.4 | K | 30.0 |
| 29 | 29 | 29 | 1 | E | 3.6 | L | 34.0 |
| 30 | 30 | 30 | 1 | E | 3.6 | L | 34.0 |
| C.E. 1 | 31 | 31 | 1 | F | 4.2 | M | 37.0 |
| C.E. 2 | 32 | 32 | 1 | F | 4.2 | N | 40.0 |
| C.E. 3 | 33 | 33 | 1 | G | 12.0 | O | 42.0 |
| C.E. 4 | 34 | 34 | 1 | B | 0.8 | O | 50.0 |
| C.E. 5 | 35 | 35 | 1 | F | 4.2 | O | 45.0 |
| C.E. 6 | 36 | 36 | 1 | F | 4.1 | M | 38.0 |
| C.E. 7 | 37 | 37 | 1 | G | 6.2 | O | 45.0 |

In the Table "C.E." indicates "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-045565, filed Mar. 19, 2021, which is hereby incorporated by reference herein in its entirety.

What is claimed is:

1. A toner, comprising:

a toner particle comprising a binder resin;

the binder resin comprising a first resin and a second resin;

the first resin being a crystalline resin;

the second resin being an amorphous resin; and a matrix-domain structure composed of a matrix comprising the first resin and domains comprising the second resin is present when a cross section of the toner particle is observed with a transmission electron microscope, with an area ratio occupied by the matrix in a total area of the matrix and the domains being 35 to 70 area %, wherein a ratio [hydrocarbon group index (Ge)]/[hydrocarbon group index (DIA)] after washing the toner with hexane is 1.10 or more, the hydrocarbon group index (Ge) is a value of A (Ge)/B (Ge) where A (Ge) is a maximum absorption peak intensity in a range of 2800 to 2900 $cm^{-1}$ corresponding to a stretching vibration of C—H and B (Ge) is a maximum absorption peak intensity in a range of 1500 to 1800 $cm^{-1}$ corresponding to a stretching vibration of C═O in an FT-IR spectrum obtained by using Ge as an ATR crystal and performing measurements by an ATR method under condition of an infrared light incident angle being 45°, and the hydrocarbon group index (DIA) is a value of A (DIA)/B (DIA) where A (DIA) is a maximum absorption peak intensity in a range of 2800 to 2900 $cm^{-1}$ corresponding to the stretching vibration of C—H and B (DIA) is a maximum absorption peak intensity in a range of 1500 to 1800 $cm^{-1}$ corresponding to the stretching vibration of C═O in an FT-IR spectrum obtained by using diamond as an ATR crystal and performing measurements by the ATR method under condition of the infrared light incident angle being 45°.

2. The toner according to claim 1, wherein the number average circle-equivalent diameter of the domains is 20 to 500 nm.

3. The toner according to claim 1, wherein a charge decay rate coefficient of the toner particle measured in an environment of 30° C. and 80% RH is 10 to 70.

4. The toner according to claim 1, wherein the first resin has a first monomer unit represented by formula (1):

(1)

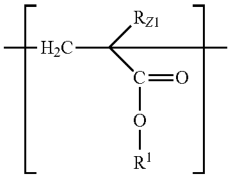

where $R_{Z1}$ represents a hydrogen atom or a methyl group, and R1 represents an alkyl group having 18 to 36 carbon atoms.

5. The toner according to claim 4, wherein a content ratio of the first monomer unit in the first resin is 30 to 80.0% by mass.

6. The toner according to claim 1, wherein the second resin is a polyester resin, a styrene acrylic resin, or a hybrid resin of a polyester resin and a styrene acrylic resin.

7. The toner according to claim 1, wherein the second resin is a styrene acrylic resin.

8. The toner according to claim 1, wherein the ratio [hydrocarbon group index (Ge)/hydrocarbon group index (DIA)] is 1.20 to 1.60.

9. A method for producing a toner comprising a toner particle comprising a binder resin, comprising the step of:

surface-treating the toner particle with hot air to obtain a heat-treated toner particle;

the binder resin comprising a first resin and a second resin;

the first resin being a crystalline resin;

the second resin being an amorphous resin; and a matrix-domain structure composed of a matrix comprising the first resin and domains comprising the second resin is present when a cross section of the toner particle is observed with a transmission electron microscope, with an area ratio occupied by the matrix in a total area of the matrix and the domains being 35 to 70 area %, wherein a ratio [hydrocarbon group index (Ge)]/[hydrocarbon group index (DIA)] after washing the toner with hexane is 1.10 or more, the hydrocarbon group index (Ge) is a value of A (Ge)/B (Ge) where A (Ge) is a maximum absorption peak intensity in a range of 2800 to 2900 $cm^{-1}$ corresponding to a stretching vibration of C—H and B (Ge) is a maximum absorption peak intensity in a range of 1500 to 1800 $cm^{-1}$ corresponding to a stretching vibration of C═O in an FT-IR spectrum obtained by using Ge as an ATR crystal and performing measurements by an ATR method under condition of an infrared light incident angle being 45°, and the hydrocarbon group index (DIA) is a value of A (DIA)/B (DIA) where A (DIA) is a maximum absorption peak intensity in a range of 2800 to 2900 $cm^{-1}$ corresponding to the stretching vibration of C—H and B (DIA) is a maximum absorption peak intensity in a range of 1500 to 1800 $cm^{-1}$ corresponding to the stretching vibration of C═O in an FT-IR spectrum obtained by using diamond as an ATR crystal and performing measurements by the ATR method under condition of the infrared light incident angle being 45°.

* * * * *